(12) United States Patent
Moon et al.

(10) Patent No.: US 7,463,828 B2
(45) Date of Patent: Dec. 9, 2008

(54) OPTICAL CHANNEL MONITOR

(76) Inventors: John Moon, 17 Promontory Dr., Wallingford, CT (US) 06492; Ralph Jones, 68 Ledgeview La., Guilford, CT (US) 06437; Charles Winston, 109 Cambridge Dr., Glastonbury, CT (US) 06033; James Sirkis, 6 Bartholomew La., Wallingford, CT (US) 06492; David Fournier, 39 Woodrow St., Hudson, MA (US) 01749; Joseph Pinto, 14 N. Cherry St. #2, Wallingford, CT (US) 06492; Robert Brucato, 150 Brook La., Cheshire, CT (US) 06410; James Dunphy, 21 Hickory Dr., South Glastonbury, CT (US) 06073; Christopher Chestnut, 6 Heather Rd., Ellington, CT (US) 06029

( * ) Notice: Subject to any disclaimer, the term of this patent is extended or adjusted under 35 U.S.C. 154(b) by 606 days.

(21) Appl. No.: 10/159,370

(22) Filed: May 31, 2002

(65) Prior Publication Data

US 2003/0007148 A1 Jan. 9, 2003

Related U.S. Application Data

(60) Provisional application No. 60/295,459, filed on Jun. 1, 2001, provisional application No. 60/351,824, filed on Jan. 24, 2002, provisional application No. 60/364,420, filed on Mar. 16, 2002.

(51) Int. Cl.
 *G02B 6/26* (2006.01)
 *H01S 3/08* (2006.01)
 *G01J 3/18* (2006.01)

(52) U.S. Cl. .............................. 398/87; 398/83; 398/84; 398/85; 398/86; 398/88; 398/29; 359/634; 359/635; 359/636; 359/17; 359/213; 359/214

(58) Field of Classification Search ............. 398/83–88, 398/29; 359/634–636, 213, 214, 17
See application file for complete search history.

(56) References Cited

U.S. PATENT DOCUMENTS 3,069,967 A    12/1962    White et al. .................... 88/14

(Continued)

FOREIGN PATENT DOCUMENTS

EP         1058095         12/2000

(Continued)

*Primary Examiner*—Jason Chan
*Assistant Examiner*—Danny W Leung

(57) ABSTRACT

An optical channel monitor is provided that sequentially or selectively filters an optical channel(s) 11 of light from a (WDM) optical input signal 12 and senses predetermined parameters of the each filtered optical signal (e.g., channel power, channel presence, signal-noise-ratio). The OCM 10 is a free-space optical device that includes a collimator assembly 15, a diffraction grating 20 and a mirror 22. A launch pigtail emits into free space the input signal through the collimator assembly 15 and onto the diffraction grating 20, which separates spatially each of the optical channels 11 of the collimated light, and reflects the separated channels of light onto the mirror 22. A λ/4 plate 26 is disposed between the mirror 22 and the diffraction grating 20. The mirror reflects the separated light back through the λ/4 plate 26 to the diffraction grating 20, which reflects the channels of light back through the collimating lens 18. The lens 18 focuses each separated channel of light ($\lambda_1$-$\lambda_N$) at a different focal point in space. One of the optical channels 11 is focused onto a receive pigtail 28, which then propagates to a photodetector 30. A pivoting mechanism 34 pivots the diffraction grating 20 or mirror 22 about a pivot point 36 to sequentially or selectively focus each optical channel 11 to the receive pigtail 28. A position sensor 42 detects the displacement of the diffraction grating 24 or mirror.

56 Claims, 24 Drawing Sheets

U.S. PATENT DOCUMENTS

| | | | | |
|---|---|---|---|---|
| 3,563,656 | A | 2/1971 | Helms | 356/96 |
| 4,111,524 | A | 9/1978 | Tomlinson | 350/96.19 |
| 4,211,486 | A | 7/1980 | Magnussen et al. | 356/328 |
| 4,355,898 | A | 10/1982 | Dakin | 356/346 |
| 4,453,826 | A | 6/1984 | Witte | 356/333 |
| 4,544,241 | A * | 10/1985 | LaBudde et al. | 359/225 |
| 4,634,880 | A * | 1/1987 | Lindow et al. | 250/566 |
| 4,664,522 | A | 5/1987 | LeFebre | 356/328 |
| 4,969,739 | A | 11/1990 | McGee | 356/308 |
| 4,973,159 | A | 11/1990 | Sohma et al. | 356/328 |
| 4,979,123 | A | 12/1990 | Yang | |
| 4,991,934 | A | 2/1991 | Hettrick | 350/162.21 |
| 5,177,560 | A | 1/1993 | Stimple et al. | 356/308 |
| 5,233,405 | A | 8/1993 | Wildnauer et al. | 356/333 |
| 5,359,409 | A | 10/1994 | Wildnauer et al. | 356/334 |
| 5,532,818 | A * | 7/1996 | Tokumoto | 356/333 |
| 5,594,744 | A | 1/1997 | Lefevre et al. | 372/20 |
| 5,699,156 | A | 12/1997 | Carver | |
| 5,710,627 | A | 1/1998 | Inoue et al. | 356/328 |
| 5,796,479 | A | 8/1998 | Derickson et al. | 356/326 |
| 5,835,210 | A * | 11/1998 | Ershov | 356/328 |
| 5,886,785 | A | 3/1999 | Lefevre et al. | |
| 5,894,362 | A | 4/1999 | Onaka et al. | 359/124 |
| 5,923,453 | A | 7/1999 | Yoneyama | 359/177 |
| 5,995,255 | A | 11/1999 | Giles | 359/124 |
| 6,011,623 | A | 1/2000 | MacDonald et al. | 356/352 |
| 6,034,767 | A | 3/2000 | Yoshikawa | 356/308 |
| 6,040,931 | A | 3/2000 | Miyazaki et al. | 359/110 |
| 6,061,129 | A | 5/2000 | Ershov et al. | 356/328 |
| 6,166,805 | A | 12/2000 | Mori et al. | 356/334 |
| 6,204,945 | B1 | 3/2001 | Iwata et al. | 359/124 |
| 6,222,954 | B1 * | 4/2001 | Riza | 385/18 |
| 6,263,127 | B1 * | 7/2001 | Dragone et al. | 385/24 |
| 6,344,910 | B1 * | 2/2002 | Cao | 398/34 |
| 6,547,145 | B2 * | 4/2003 | Colley et al. | 235/462.36 |
| 6,606,340 | B2 * | 8/2003 | Zhang et al. | 372/107 |

FOREIGN PATENT DOCUMENTS

| | | |
|---|---|---|
| GB | 2344188 | 5/2000 WO |
| WO | 9852021 | 11/1998 |
| WO | WO 0036377 | 6/2000 |

* cited by examiner

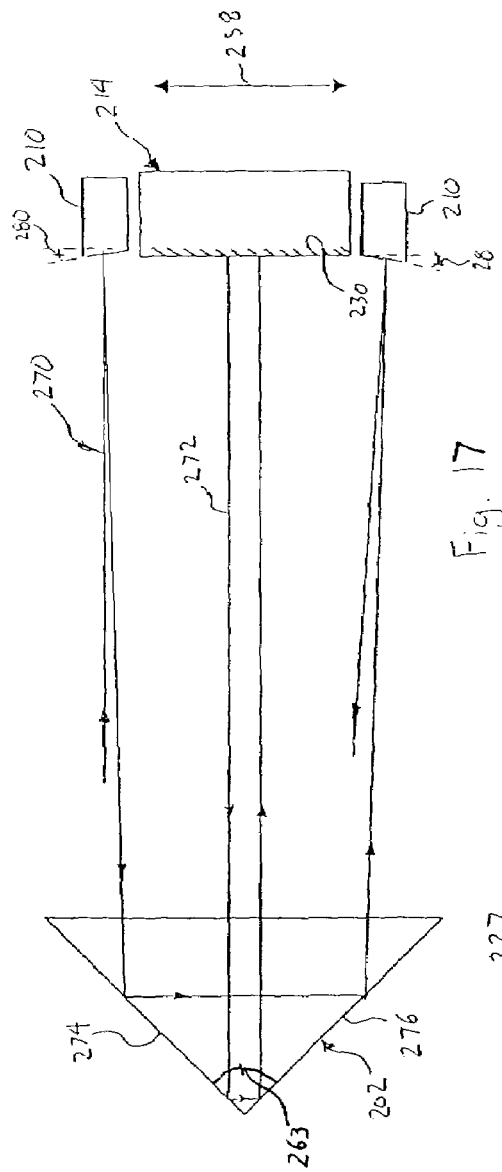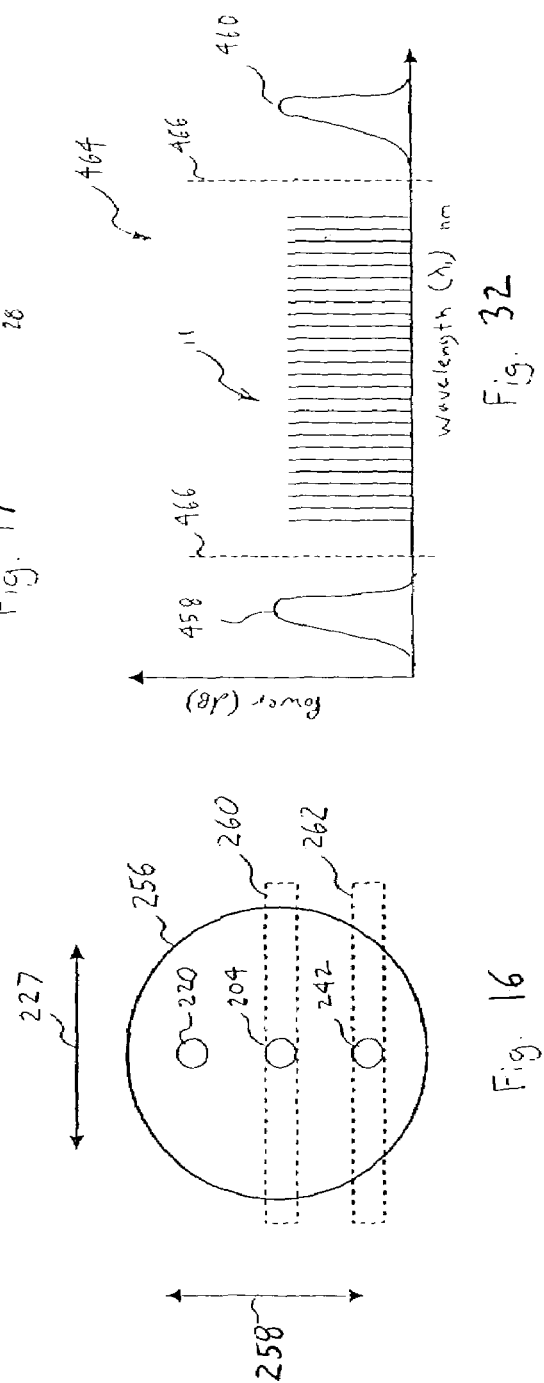

ial Patent Application Ser. No. 60/295,459, filed on Jun. 1, 2001 entitled "Optical Channel Monitor", U.S. Provisional Patent Application Ser. No. 60/351,824, filed on Jan. 24, 2002 entitled "Optical Channel Monitor" and U.S. Provisional Patent Application Ser. No. 60/364,420, filed on Mar. 16, 2002 entitled "Optical Channel Monitor" contain subject matter related to that disclosed herein, and which are incorporated herein by reference in its entirety.

TECHNICAL FIELD

The present invention relates to an optical channel monitor or spectrum analyzer, and more particularly to an optical channel monitor for determining a parameter of an optical channel of a WDM optical input signal that includes a diffraction grating and reflector assembly for spatially separating the optical channels and moving at least one of the grating and reflector assembly to sequentially or selectively select and detect respective optical channels.

BACKGROUND ART

The proliferation of smart amplifiers, dynamic gain equalizers and optical cross-connects has added tremendous functionality to current and next generation optical networks. These intelligent WDM networks require performance or channel monitors to monitor the spectrum of the optical channels, including channel power and channel identification. This spectrum information is particularly valuable considering the frequency at which the optical channels dynamically change.

Conventional network monitors, such as optical spectrum analyzers OSAs, provide comprehensive channel information, however OSAs are expensive, bulky and provide more capabilities or features than necessary for a telecommunications network.

One such OSA is shown in U.S. Pat. No. 5,233,405 entitled "Optical Spectrum Analyzer Having Double Pass Monochromator". The optical spectrum analyzer includes double pass monochromator that has an input optical fiber for emitting a light beam, a diffraction grating for diffracting the input light beam to produce a spatially dispersed light beam, a slit for passing a selected portion of the dispersed light beam and an output optical fiber. A motor rotates the diffraction grating to detected each of the optical channels or wavelength bands. The position of the grating is sensed by a shaft encoder.

A similar double pass monochromator is shown in U.S. Pat. No. 6,166,805, entitled "Double Pass Monochromator". The monochromator includes a diffraction means, a pair of concave mirrors, a return reflection means, a photodetector and a plurality of slits. The diffraction grating pivots about an axis of rotation.

Besides OSAs based on free space optics, grating-based channel monitors are known. One such channel monitor is shown in U.S. Pat. No. 5,995,255, entitled "Concatenated Fiber Grating Optical Monitor". The monitor is a wavelength division multiplexing (WDM) optical monitor, based on concatenated fiber gratings, that uses a modulator and detector.

What is needed is a small, inexpensive channel monitor that provides basic channel parameters, such as channel power and channel identification.

SUMMARY OF THE INVENTION

An object of the present invention is to provide a low cost optical channel monitor for sensing a parameter of an optical channel of a WDM input signal (e.g., channel power) that includes a diffraction grating and mirror assembly for spatially separating the optical channels and moving at least one of the grating and mirror to sequentially or selectively focus an optical channel to an optical pigtail and/or photodiode.

In accordance with an embodiment of the present invention, an optical channel monitor of an optical input signal that includes a plurality of optical channels. The optical channel monitor comprises a first optical waveguide for projecting the optical input signal. A collimator collimates the input signal projecting from the optical lens. A light dispersion element diffracts the collimated light into spectrally spaced optical channels. A reflector reflects the spectrally-spaced optical channels back to the light dispersion element. A first mirror is disposed adjacent to the reflector that provides an optical signal indicative of the first relative position of the reflector. A pivoting mechanism rotates at least one of the light dispersion element and the reflector to spectrally move the spectrally-spaced optical channels to select an optical channel.

In accordance with another embodiment of the present invention, an optical channel monitor of an optical input signal includes a plurality of optical channels. The optical channel monitor comprises a first optical waveguide for projecting the input signal. A collimator collimates the input signal projecting from the optical lens. A light dispersion element diffracts the collimated light into spectrally spaced optical channels. A reflector reflects the spectrally spaced optical channels back to the light dispersion element. A pivoting mechanism rotates the reflector to spectrally move the spectrally spaced optical channels to select an optical channel.

In accordance with another embodiment of the present invention, an optical channel monitor of an optical input signal includes a plurality of optical channels. The optical channel monitor comprises a first optical waveguide for projecting the input signal. A collimator collimates the input signal projecting from the optical lens. A light dispersion element diffracts the collimated light into spectrally spaced optical channels. A reflector reflects the spectrally-spaced optical channels back to the light dispersion element. A pivoting mechanism rotates at least one of the light dispersion element and the reflector to spectrally move the spectrally-spaced optical channels to select an optical channel.

BRIEF DESCRIPTION OF THE DRAWINGS

FIG. 16 is an end view of a pigtail assembly of the optical channel monitor of FIG. 14 in accordance with the present invention;

FIG. 17 is a side elevational view of a portion of the optical channel monitor of FIG. 14 illustrating the optical path of light reflecting between a prism, grating and start mirrors;

FIG. 32 is a graphical representation of the output signal of the optical detector of the optical channel monitor of FIG. 31;

BEST MODE FOR CARRYING OUT THE INVENTION

Figure 1:
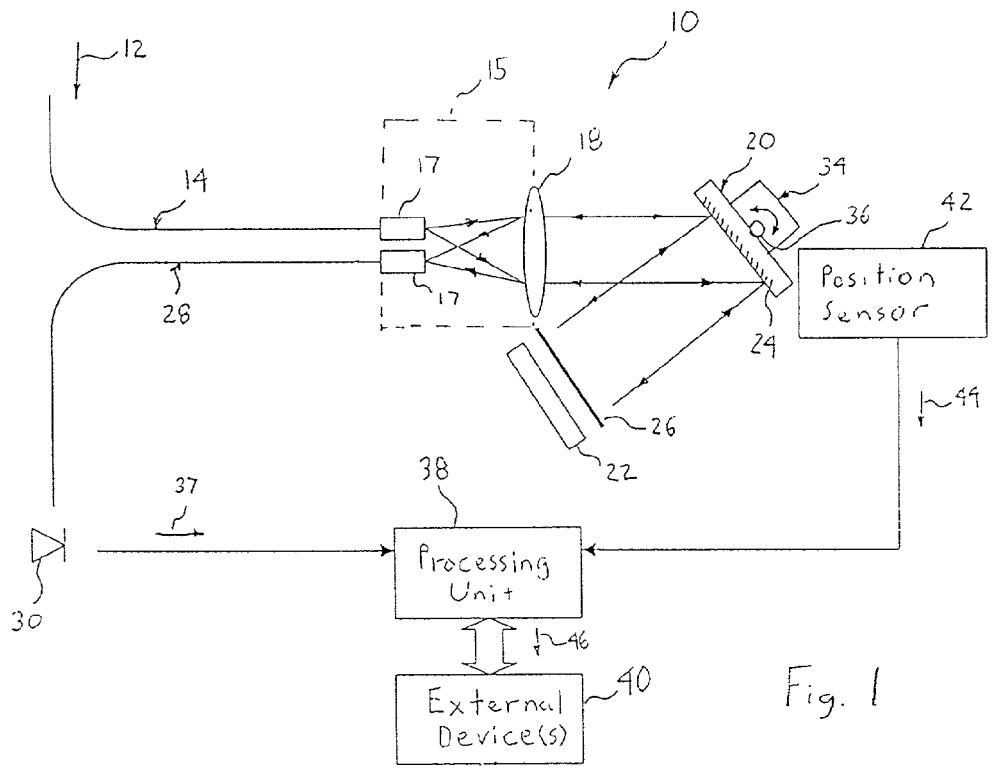
FIG. 1 is a block diagram of a dual pass optical channel monitor (OCM) in accordance with the present invention.

Referring to FIG. 1, an optical channel monitor (OCM), generally shown as 10, sequentially or selectively filters an optical channel(s) 11 (see FIG. 3) of light from a wavelength division multiplexing (WDM) optical input signal 12 and senses predetermined optical parameters of the optical signal (e.g., channel power, channel presence, signal-noise-ratio, channel wavelength) of each selected optical channel. An optical channel of a WDM input signal 12 is defined as a wavelength band of light (i.e., optical channel 14), which is centered at a respective channel wavelength ($\lambda_1, \lambda_2, \lambda_3, \ldots \lambda_N$). The OCM 10 is a free-space optical device that includes an optical collimator assembly 15, a light dispersion element 20 (e.g., a diffraction grating) and a reflective element 22 (e.g., a mirror). The collimator assembly 15 includes at least one collimating lens 18.

As shown, the WDM input signal 12 is provided to an optical fiber or a launch pigtail 14 having a capillary tube formed of glass, for example, that is attached to an end of the pigtail, such as by epoxying or collapsing the tube onto the pigtail. The input signal 12 exits the launch pigtail (into free space) and passes through the collimating lens 18, which collimates the light. The collimating lens may be an aspherical lens, an achromatic lens, a doublet, a GRIN lens, Fresnel lens, a laser diode doublet or any combination of lens to collimate the launch light.

The focal length of the collimating lens 18, for example, is approximately 40 mm. The collimated light is projected onto the diffraction grating 20, which spectrally disperses each of the optical channels 11 of the collimated light, and images the separated channels of light onto the mirror 22.

In one embodiment, the grating 20 is formed of a plate of silica or glass having a coating, wherein a plurality of grooves 24 (or lines) are etched, ruled or otherwise formed in the coating. In one embodiment, the diffractive grating 20 has a predetermined number of lines, such as 600 lines/mm, 830 lines/mm and 1200 lines/mm. The resolution of the channel monitor improves as the number of lines/mm in the grating increases. The lines or grooves of the grating are parallel to the axis of rotation of the grating, which will be described in greater detail hereinafter. The gratings 20 may be similar to those manufactured by Thermo RGL, part number 3325FS-660 and by Optometrics, part number 3-9601. Alternatively, the grating may be formed using holographic techniques, as is well known in the art, or volumetric phase holograms. Further, the light dispersion element may include a prism to disperse the light as the light passes therethrough, or a prism having a reflective surface or coating on its backside to reflect the dispersed light. In addition, the grating may be formed having surface reliefs and/or sol gel surface reliefs.

One skilled in the art will appreciate that a diffraction grating has a predetermined polarization dependence loss (PDL) associated therewith. The PDL of a diffraction grating 20 is dependent on the geometry of the etched grooves 24 of the grating. Consequently, means to mitigate PDL may be desired. One method of mitigating the PDL is to provide a λ/4 plate 26 between the mirror 22 and the diffraction grating 20. The fast axis of the λ/4 plate is aligned to be approximately 45 degrees to the direction or axis of the lines 24 of the diffraction grating 20. The mirror is angled to reflect the separated channels back through the λ/4 plate to the diffraction grating. Consequently, the λ/4 plate rotates the plane of polarization of the light about the axis of the λ/4 plate when the light passes twice through. For example, the light disposed in the vertical polarization plane circularly polarizes the light after the first pass through the λ/4 plate. When the light passes through the λ/4 plate again, the light is further rotated to the horizontal polarization plane. Effectively, the λ/4 plate averages the polarization of the light to reduce or eliminate the PDL. While the channel monitor 10 of FIG. 1 comprises a λ/4 plate, one will appreciate that the λ/4 plate may not be necessary if the diffraction grating has low polarization dependencies, or other PDL compensating techniques are used.

Figure 2:
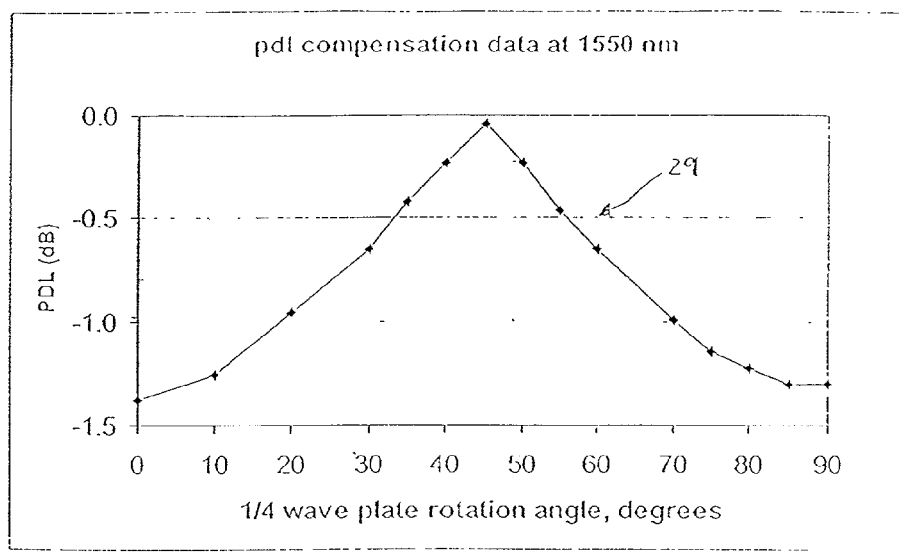
FIG. 2 is a graphical representation of data of an optical channel monitor of FIG. 1 illustrating the performance of a $\lambda/4$ waveplate.

FIG. 2 is a plot 29 of data illustrative of the PDL at 1550 nm wavelength as the λ/4 plate 26 is rotated axially. Note that the PDL is approximately 0 dB at 1550 nm when the fast axis of the λ/4 plate 26 is at a rotation angle of 45 degrees to the direction or axis of the lines of the diffraction grating 20.

Figure 3:
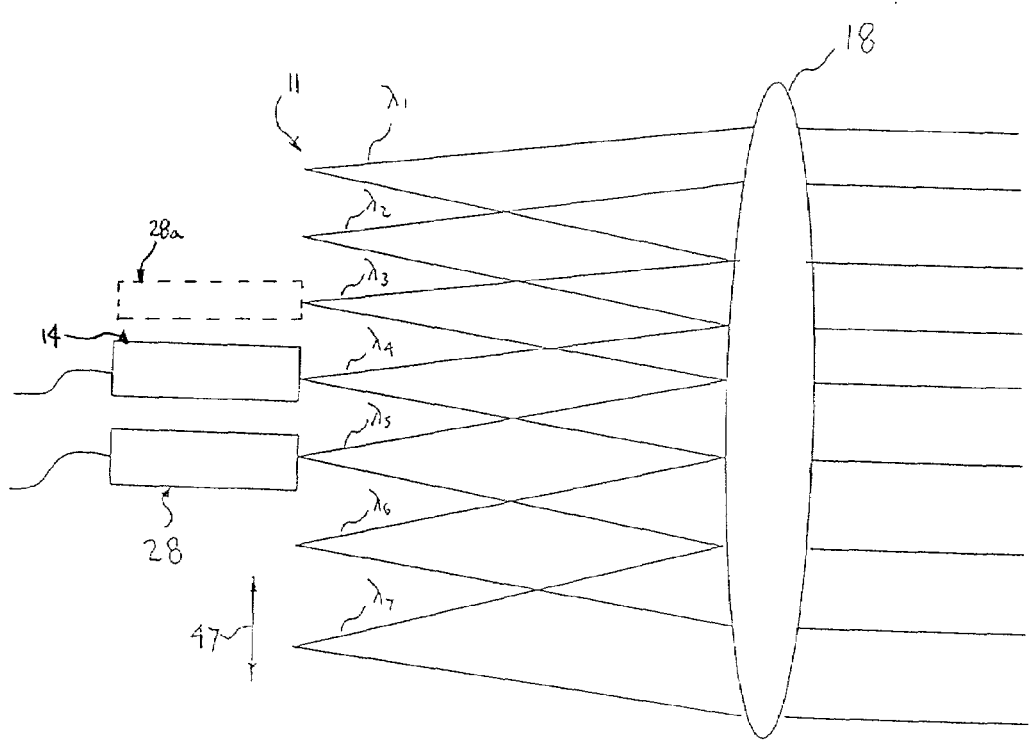
FIG. 3 is an expanded view of the launching pigtail, receiving pigtail and collimating lens of the optical channel monitor of FIG. 1.

Referring back to FIG. 1, the diffraction grating 20 further disperses (separates) the optical channels 11 of the reflected optical channels of light and diffracts the channels of light back through the collimating lens 18. The lens 18 focuses each separated channel of light ($\lambda_1$-$\lambda_N$) at a different focal point in space, as best shown in FIG. 3, which will be described in greater detail hereinafter. One of the optical channels 11 is focused onto an optical fiber or a receive pigtail 28, which then propagates to a photodetector 30 through the receive pigtail. A pivoting mechanism 34, which will be described in greater detail hereinafter, pivots the diffraction grating 20 about a pivot point 36 to sequentially or selectively focus each optical channel 11 to the receive pigtail 28 at approximately 50 ms or 18 Hz. The pivoting mechanism 34, thus, enables each optical channel of the WDM input signal 12 to be individually detected by the photodetector 30. The photodetector provides a sensed signal 37, indicative of a parameter of the channel (i.e. channel power) to a processing unit 38, which interfaces with external device(s) 40.

The channel monitor 10 further includes a position sensor 42 for detecting the displacement of the diffraction grating 20 and provides a position signal 44 to the processing unit 38 indicative of the position or displacement of the diffraction grating. The position sensor may include a capacitive-based sensor, an inductive-based sensor, an encoder or other known displacement sensors. The processing unit, in response to the sensed signal 37 and the position signal 44, generates and provides an output signal 46 to the external device(s) 40, which is indicative of an optical parameter(s) if the respective input signal.

FIG. 3 illustrates an expanded view of the launch pigtail 14, the receive pigtail 28 and the collimating lens 18 of FIG. 1. As shown, the lens focuses the separated, collimated optical channels (e.g., $\lambda_1$-$\lambda_7$) at different spatial locations in free space. As the diffraction grating 20 of FIG. 1 pivots about pivot point 36, the optical channels are selectively focused at the receive pigtail 28. For example as shown in FIG. 3, the grating is positioned such that the optical channel centered at wavelength $\lambda_5$ is focused at the receive pigtail 28. As the grating pivots, the focal point of each optical channel spatially shifts laterally in the plane of motion of the grating 20, as indicated by arrow 47, to thereby focus each channel onto the receive pigtail 28. The present invention further contemplates a plurality of receive pigtails 28,28a that will be described in greater detail hereinafter.

Figure 4:
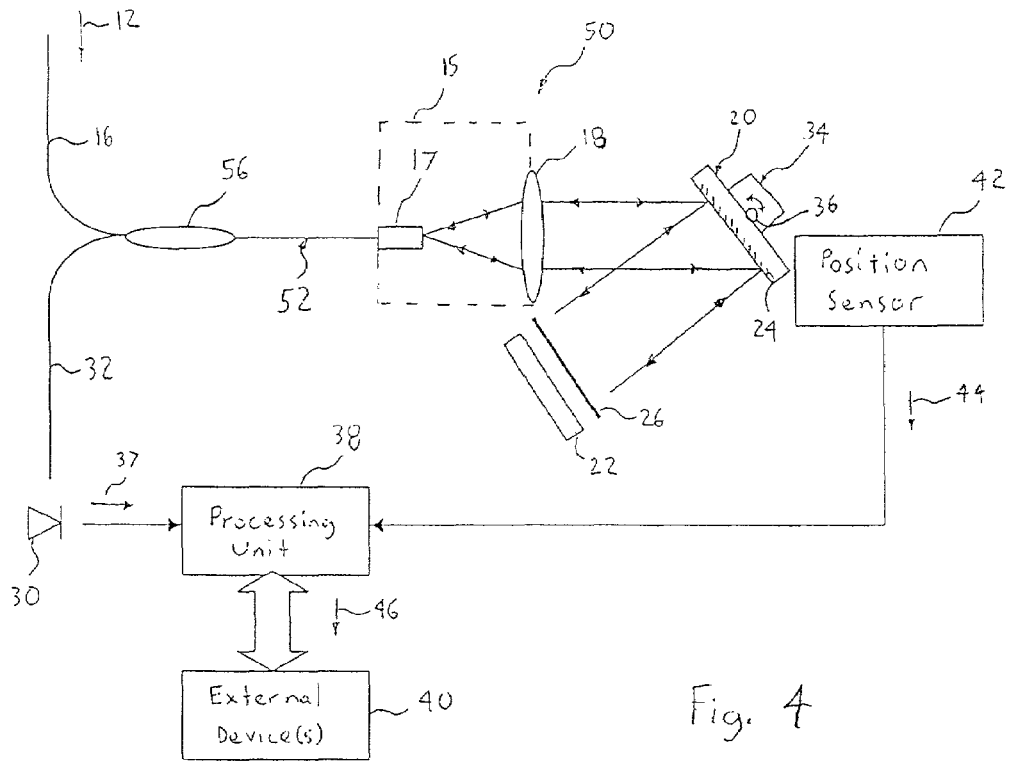
FIG. 4 is a block diagram of another embodiment of a dual pass optical channel monitor in accordance with the present invention.

Referring to FIG. 4, another embodiment of optical channel monitor 50 is shown, which is similar to the channel monitor 10 of FIG. 1, and therefore components similar to both OCMs 10, 50 have like reference numerals. The OCM 50 includes a single pigtail 52 that both launches the WDM optical signal 12 and receives the selected optical channel. A light directing device 56, such as a directional coupler, a 50-50 optical coupler and isolator, or an optical circulator, directs the input signal 12 through optical fiber or the receive pigtail 52; and directs the light received by the pigtail 52 through optical fiber 32 to the photodetector 30.

Figure 5:
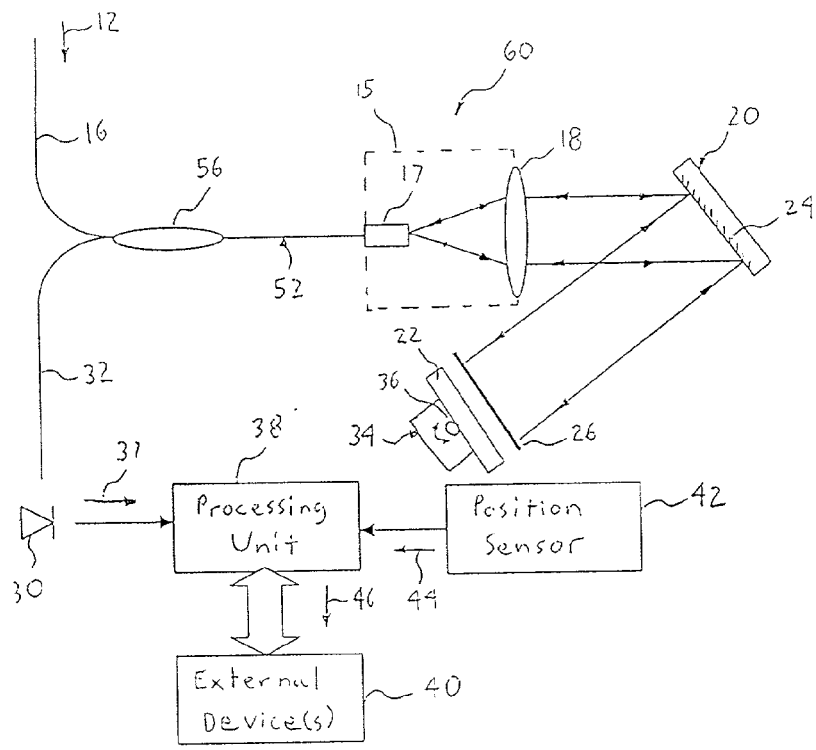
FIG. 5 is a block diagram of another embodiment of a dual pass optical channel monitor in accordance with the present invention.

While the optical channel monitors 10, 50 of FIGS. 1 and 4, sequentially or selectively sense each of the optical channels by pivoting the diffraction grating 20, one will appreciate that alternatively the reflecting mirror 22 may be pivoted to selectively focus the optical channels to the receiving pigtail 28, 52 as shown in FIG. 5, while the diffraction grating remains stationary 24. Similar components of FIGS. 4 and 5 have like reference numerals. One will appreciate that the present invention further contemplates that both the diffraction grating 20 and the reflecting mirror 22 may both rotate or tilt.

While the optical channel monitors 10,50,60 of FIGS. 1, 4 and 5, respectively, sense each of the optical channels by pivoting the diffraction grating 20 and/or reflecting mirror 22, one will recognize that the launch pigtail 52 and/or the collimator 18 may be tilted, pivoted or laterally translated in the spectral direction as shown by arrows 47.

Figure 6:
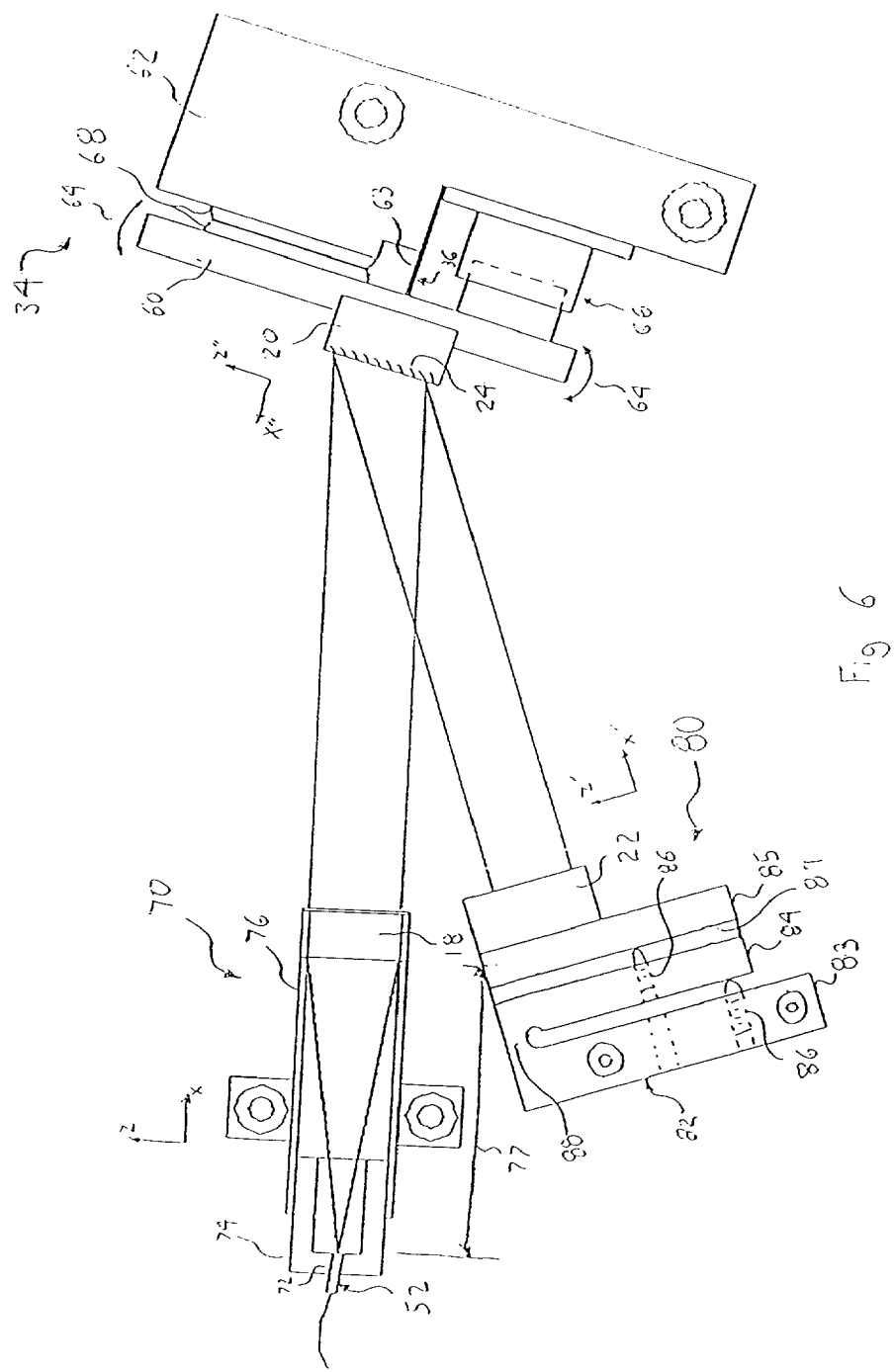
FIG. 6 is a top plan view of another embodiment of a dual pass optical channel monitor in accordance with the present invention.

FIG. 6 is illustrative of embodiments of the pivoting mechanism 34, a collimator assembly 70 and a mirror assembly 80 that are mounted to a housing (not shown) in an optical configuration similar to the optical channel monitor 50 of FIG. 4. The pivoting mechanism 34 includes a plate 60 (or block) whereby the diffraction grating 20 is mounted thereto. The plate 60 is mounted pivotally to a base 62 by a flexible resilient strip of material 63 to permit the grating 20 to pivot in a clockwise/counterclockwise direction as indicated by the arrows 64 about the pivot point 36. The strip of material (i.e., spring steel or other metallic material) is secured at one end to the mounting plate and the other end of the strip is secured to a wall, defining a recess in the base 62. The strip provides relatively free motion in the clockwise and counterclockwise directions as indicated by arrows 64, while limiting motion in the other planes. As shown, the grating 20 is centered at the point of pivot 36 to limit radial movement of the grating. However, one will appreciate the point of pivot 36 may be displaced from the center of the grating, provided radial movement of the grating is compensated when spatially locating the optical channel.

An actuator 66, which may be embedded in or mounted to the base 62, pivots the plate 60 and the grating 20 about the pivot point 36. The actuator may include a voice coil, electroceramics, a motor and cam configuration, a motor and slide configuration, an arc motor (similar to that used to drive the arm of a disk drive), a linear motor and/or a stepper motor.

As shown, the actuator 66 (e.g., a voice coil) is mounted to the recessed portion of the base 62 and to one end of the mounting plate 60. As will be described in greater detail hereinafter, the actuator may be controlled in an open loop mode or a closed loop mode. In the open loop mode, the actuator 66 pivots the grating 20 at a predetermined frequency and angular range. In the closed loop mode, the actuator pivots the grating in response to a signal provided by the processing unit 38 in accordance with the feedback position signal 44, a control signal indicative of the desired channel to be detected and a positioning algorithm.

A pair of capacitive plates 68 is mounted to the plate 60 and base 62, respectively, to provide the position signal 44 (see FIG. 4), which is indicative of the position of the diffraction grating 20, to the processing unit 38. The position signal 44 is indicative of the spacing between the capacitive plates 68. Consequently, as the actuator 66 pivots the plate 60 and grating 20, the spacing between the capacitive plates correspondingly vary to thereby change the capacitance between the plates, resulting in a position signal indicative of the position/displacement of the grating. The capacitive plates may be formed of glass wafers, or other dielectric material, with the opposing sides being coated with a conductive material, such as gold. Although the invention has been described with respect to using capacitive plates 68 to measure the gap distance or angular displacement, it should be understood by those skilled in the art that other gap sensing techniques may be used, such as inductive, optical, magnetic, microwave, time-of-flight based gap sensors; and other angular displacement measuring techniques, such as encoders, similar to those decribed in co-pending U.S. patent application Ser. No. 09/950,509, which is incorporated herein by reference.

Alternatively, the mounting plate 60 and the diffraction grating 20 may be pivoted by oscillating the grating and mounting plate at the resonant frequency of the actuator assembly. In this embodiment, a voice coil or other solenoid-like device may be actuated to provide an initial movement of the mounting plate to begin the oscillation thereof. Once the mounting plate is oscillating, the actuator may be used to provide velocity feedback (which is integrated to provide position feedback) through the solenoid coil by measuring the change in the magnetic field as the plunger moves in and out of the solenoid coil.

The collimator assembly 70 includes the launch/receive pigtail 52 mounted in fixed relation to the collimating lens 18. As shown, the pigtail 52 is mounted within a through-bore 72 of a cylindrical mount 74. The pigtail is disposed at a predetermined angle to reduce loss caused by reflection or back reflection off the surface of the pigtail.

The mount 74 is secured in one end of a cylindrical tube or housing 76 and the lens 18 is disposed at the other end of the tube. The distance 77 between the pigtail 52 and the lens 18 is substantially equal to the focal length of the lens, as shown. The pigtail mount may slidably or threadedly engage the tube to enable the distance between the lens and the pigtail to be adjusted or optimized.

The mirror assembly 80 includes the mirror 22 mounted to a base 82. The base comprises a plurality of fingers 83-85 to enable the angle of the mirror to be adjusted about the y' and z' axes. The angle of the mirror about the y' axis may be adjusted by turning a set screw 86 disposed between fingers 83,84, which pivots the mirror 22 about pivot point 88. The angle of the mirror about the z' axis may be adjusted by turning a set screw 86 disposed between fingers 84,85, which pivots the mirror about pivot point 89.

Figure 7:
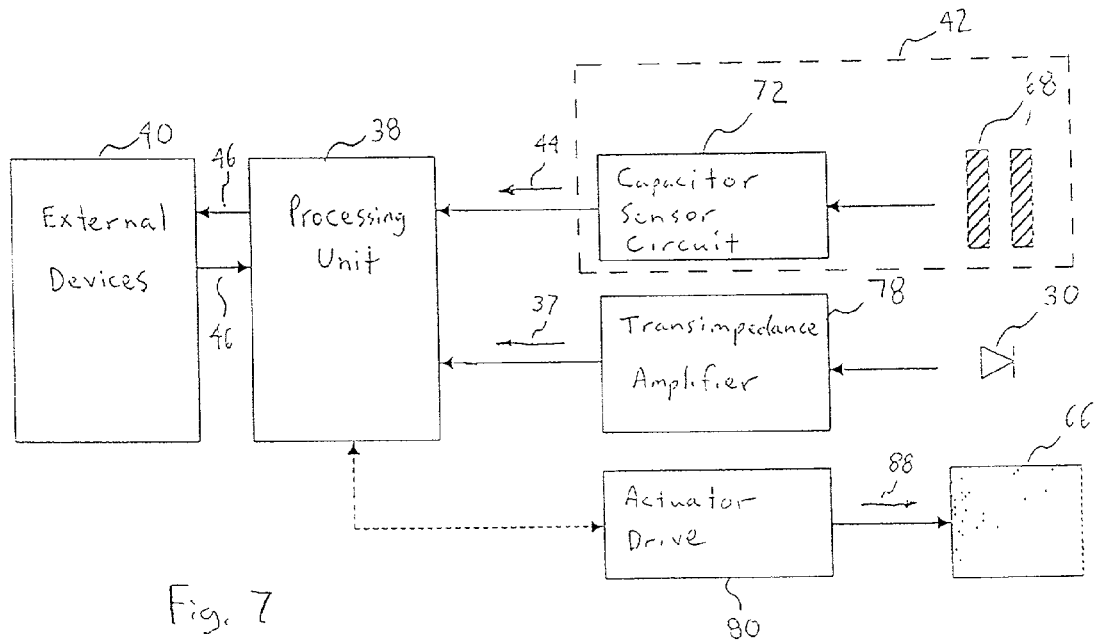
FIG. 7 is a block diagram of the electronic configuration of an optical channel monitor in accordance to the present invention.

FIG. 7 illustrates a block diagram of the electronic configuration of the optical channel monitors 10, 50, 60 of FIGS. 1, 4 and 5, respectively. The capacitor plates 68 provide a signal, indicative of the capacitance therebetween, to a capacitor sensor circuit 72. The sensor circuit processes the input signal and generates the position signal 44, which is indicative of the relative spatial position of the diffraction grating 20 or reflector. The position signal 44 is provided to the processing unit 38. The processing unit 38 includes a processor, A/D converter, and I/O interface to provide to the external devices 40 an output signal(s) that is indicative of desired channel parameters of the detected channels in accordance with a processing algorithm and external command signals 46.

The photodetector 30 provides a signal to a transimpedance amplifier 78 that amplifies and conditions the signal, which is indicative of a parameter of optical channel being detected (e.g., channel power). The amplified signal 37 is then provided to the processing unit 38.

An actuator drive 80 provides a drive signal 88 to the actuator 66, which may operate in an open loop or closed loop mode. In the open loop mode, the actuator drive 80 provides a drive signal that energizes the actuator in discrete steps or continuously to pivot the grating 20 in a clockwise and counterclockwise direction at a predetermined rate and over a predetermined angular range.

The actuator drive may function independent of the processing unit 38, or alternatively, may function in response to a start signal (as shown in dashed lines) provided by the processing unit, which simply initiates the actuation of the drive 80 at the predetermined parameters. In addition, the processing unit 38 may further provide a signal to the actuator, which is indicative of the frequency and/or angular range of oscillation of the grating 20 about the pivot point 36, and thus enabling the operating parameters of the actuator (operating in the open loop) to be changed.

In the closed loop mode, the processing unit 38 may provide drive signals to pivot the grating 20 to a selected position, in response to the position signal provided by the capacitive plates 68 and the capacitor sensor circuit 72. Alternatively, the processor may change the frequency and/or angular range of oscillation of the grating 20 in response to the position signal and/or input control command provided by a user.

Figure 8:
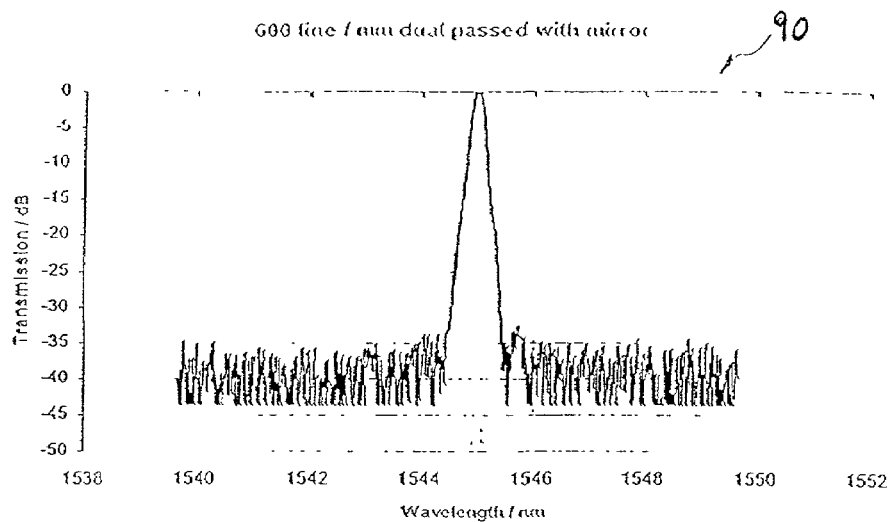
FIG. 8 is a graphical representation of data illustrating the transfer function of the optical channel monitor of FIG. 6.
Figure 9:
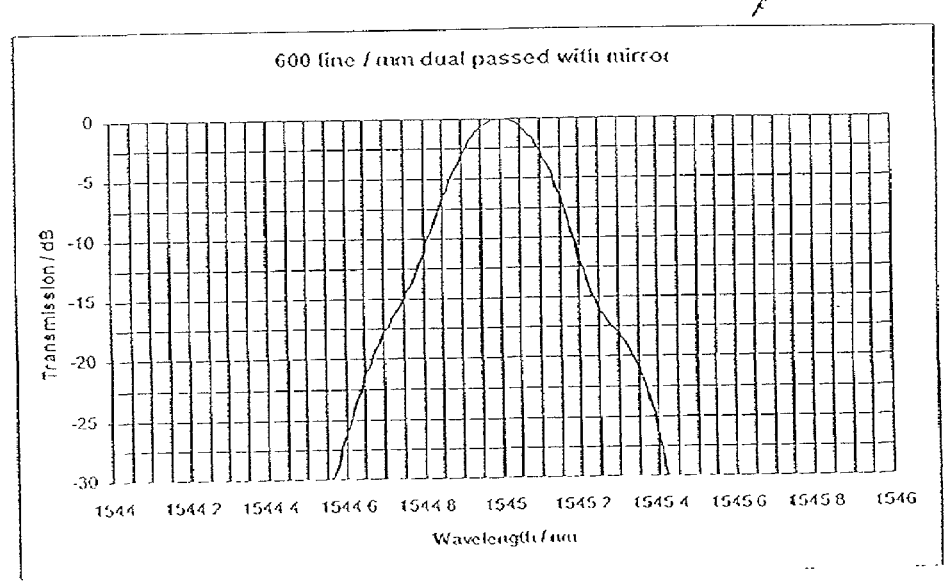
FIG. 9 is a graphical representation of data illustrating the transfer function of the optical channel monitor of FIG. 6.

FIG. 8 is a plot 90 of data illustrative of the optical transfer function of a dual pass optical channel monitor 50 having a diffraction grating 20 with 600 line/mm similar to that shown in FIG. 4. FIG. 9 is an expanded view 92 of the upper portion of the transfer function of FIG. 8 that shows the transfer function has a full width, half maximum of approximately 200 pm.

Figure 10:
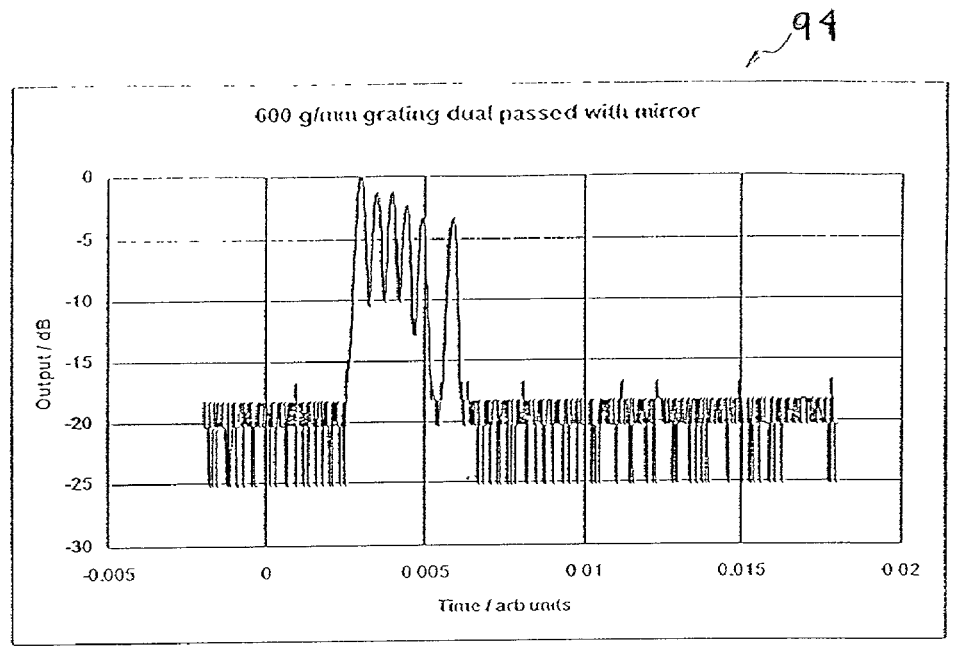
FIG. 10 is a graphical representation of data illustrating the output of the optical channel monitor of FIG. 6.
Figure 11:
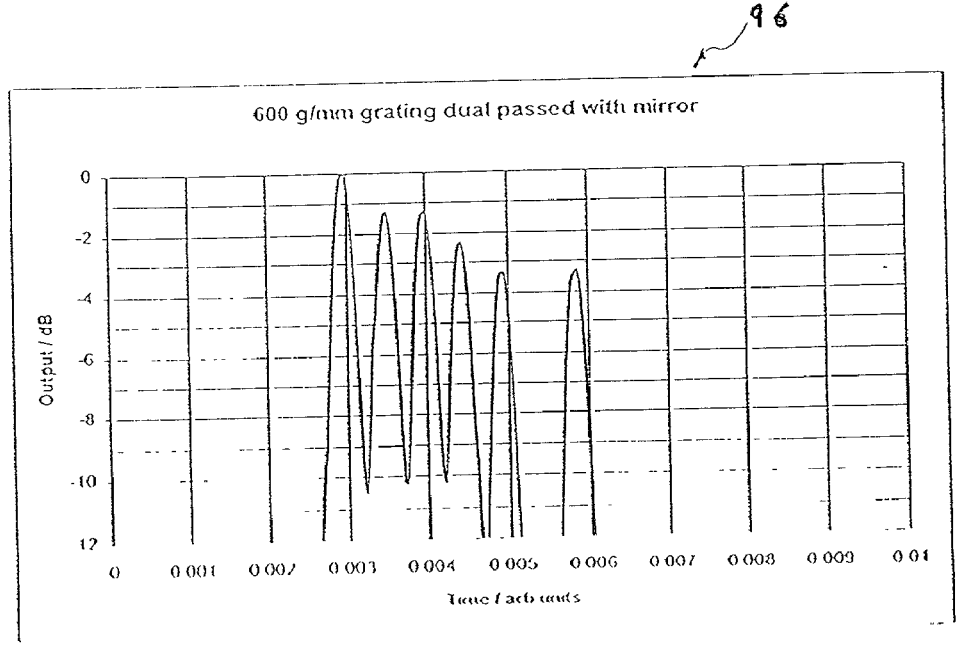
FIG. 11 is a graphical representation of data illustrating the output of the optical channel monitor of FIG. 6.

FIG. 10 is a plot 94 over time or scanning period that provides a transfer function of each of the optical channels. The channel monitor 50 is similar to that shown in FIG. 4, whereby the grating is 600 lines/mm. As shown, five optical channels are separated by 50 GHz spacings and two channels are separated by 100 GHz spacings. FIG. 11 is an expanded view 96 of the upper portion of the output of the channel monitor of FIG. 10 that shows a peak-valley ratio (PVR) of approximately 20 dB for 100 GHz spaced channels and 9 dB for 50 GHz spaced channels.

In another embodiment of the present invention as shown in FIG. 3, any of the channel monitors 10, 50, 60, 100 may include a plurality of receive pigtails 28, 28a for concurrently sensing multiple optical channels. Each receive pigtail provides their respective optical channel to a corresponding photodiode 30. The sensing of multiple optical channels open up the spectrum range to include both the C-band and L-band without increasing the range of motion of the grating 20 (or reflector 22) and position sensor 42 (i.e., capacitive plates 68). The spacing between the receive pigtails 28, 28a may be any predetermined distance such that each receive pigtail receives a portion of channels over the pivotal range of the grating 20. The multiple receive pigtails may be used to increase the number of scans in one ½ cycle of the actuator to increase the "speed" of the OCM, which will be described in greater detail hereinafter.

One will appreciate that while multiple receive and launch pigtails 14,28,28a are shown having respective capillary tubes 17 attached thereto. The ends of each pigtail 14,28,28a may be attached within a single capillary tube 17 wherein the ends of the pigtails are disposed at a predetermined spacing and orientation.

One will also appreciate that increasing the number of lines/mm in the grating 20 and/or increasing the diameter of the optical light beams may improve the resolution of the optical channel monitor of the present invention.

As a free-spaced optical device, the OCMs of the present invention are inherently sensitive to temperature, shock and vibration. In particular, the launch pigtail 14 and collimating lens 18 are sensitive to changes in the x-axis or horizontal direction, while the grating 20, the λ/4 plate 26 and the mirror 22 are sensitive to changes to rotation or tilt about the z-axis. To desensitize or reduce changes in the x-axis for the collimating lens and pigtail, the lens and pigtail are mounted within a tube or housing 76 to maintain the distance therebetween, as shown in FIG. 6. Concerning the tilt about the z-axis of the mirror 22 and/or the grating 20, the pivot of the pivoting mechanism 34 may be stiffened in the y-axis by substituting the flexible sheet material 63 with a flexural pivot, such as that manufactured by Lucas Varity, part number 5010-600 or 5010-800. Further, while the mirror 22 is shown to be flat, the mirror may be substituted for a roof prism, a folded mirror or a reflecting dihedron.

Another means to desensitize the effect of y-tilt of the mirror 22 is to provide a cylindrical lens between the λ/4 plate 26 and the grating 20 to reduce the dimension of the light beam in the y-axis or vertical direction.

While the optical channel monitors 10, 50 of FIGS. 1 and 4, respectively, selectively detects each of the optical channels $(\lambda_1-\lambda_N)$ by pivoting the diffraction grating 20, one will appreciate that the reflecting mirror 22 may be pivoted to selectively focus the optical channels to the receiving pigtail 28, 52 as shown in FIG. 5.

Figure 12:
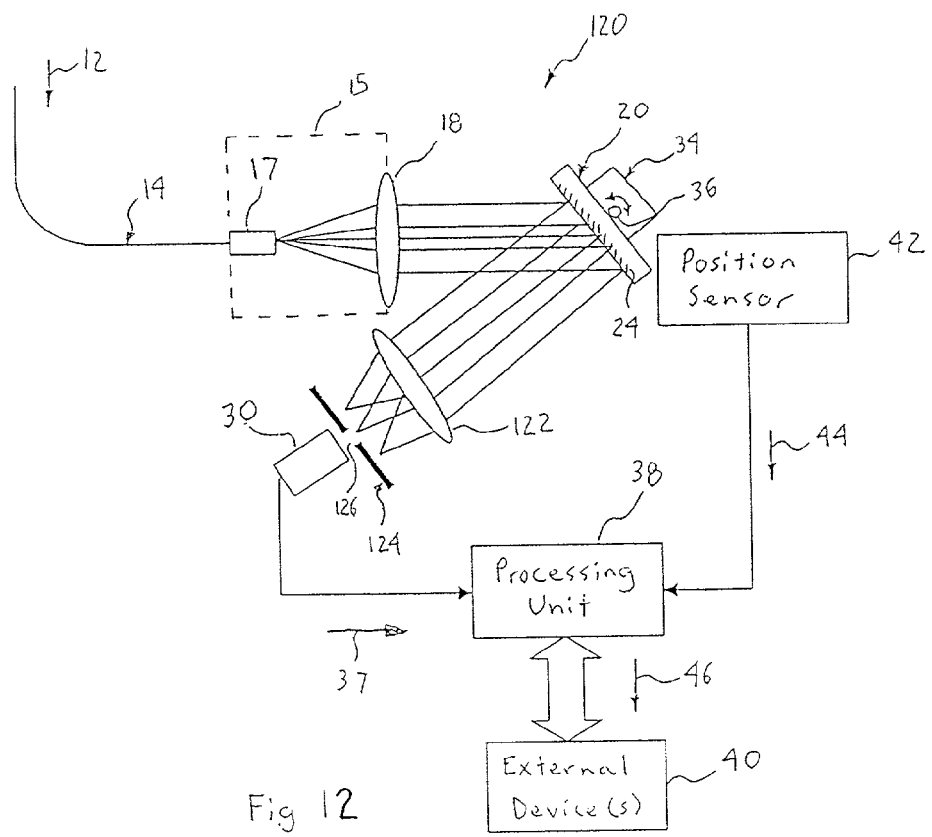
FIG. 12 is a block diagram of an embodiment of a single pass optical channel monitor in accordance with the present invention.

Referring to FIG. 12, a single pass optical channel monitor 120, in accordance with the present invention, includes a number of components similar to the channel monitor 50 of FIG. 4, and therefore, similar components have like reference numerals. The optical channel monitor 120 of FIG. 12 does not include a mirror to reflect the separated signals back to the diffraction grating 20. The single pass channel monitor 120 reflects light off the grating only once.

The separated light reflecting off the grating 20 passes through a collimating lens 122, which focuses each optical channel spatially apart as shown, and as described hereinbefore in FIGS. 3 and 4. A mask or sheet material 124 having a slit 126 is disposed between the collimating lens 122 and the photodiode 30. The slit of the mask 124 passes the desired channel through the slot to the photodiode and blocks the remaining channels. Similar to the channel monitor 50 of FIG. 4, the diffraction grating 20 may be rotated to selectively or sequentially focus an optical channel through the slot 126 to the photodiode 30. Alternatively, the mask 124 and photodiode 30 may be translated linearly to select each optical channel.

Figure 13:
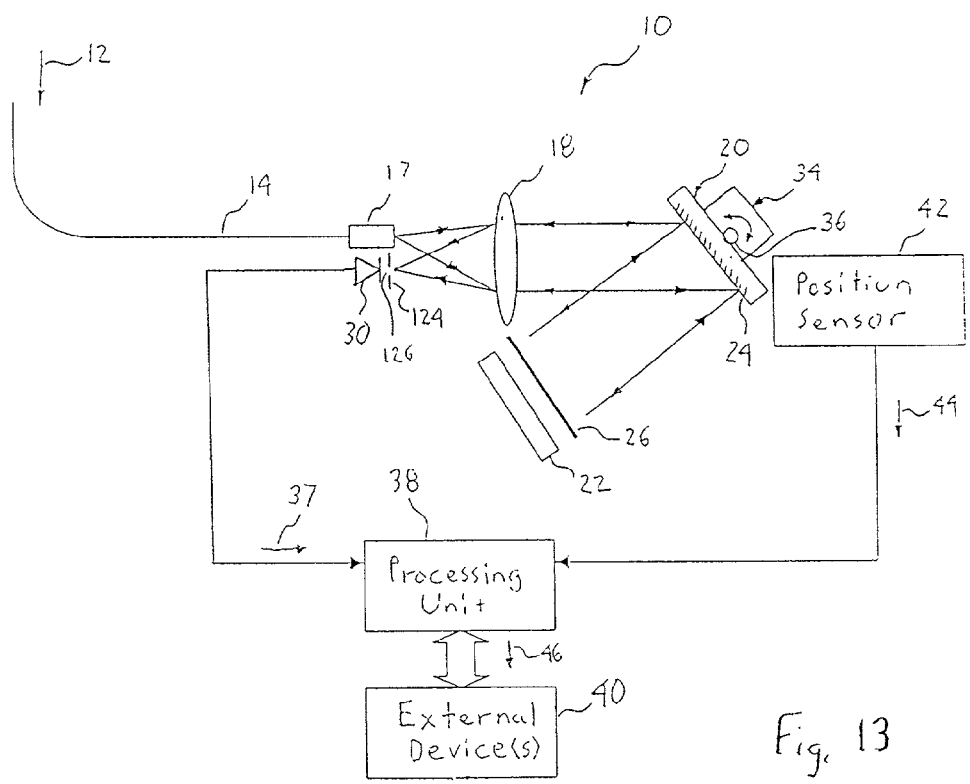
FIG. 13 is a block diagram of another embodiment of a dual pass optical channel monitor in accordance with the present invention.

FIG. 13 illustrates another embodiment of FIG. 1 wherein the receive pigtail 28 is substituted with a mask 124, similar to that described hereinbefore, having a slit 126 for passing the desired channel 11 to the photodetector 30. Advantageously, this embodiment reduces the OCM's sensitivity to shock, vibration and temperature in the y-axis or vertical direction because the mask filters the unwanted optical channels, and thus allowing a photodiode 30 to be used, which has a greater area for receiving the optical channel than the receive pigtail. One skilled in the art will appreciate that the receive pigtails of any of the embodiments described hereinbefore may be substituted for the mask 124 as described.

As described hereinbefore, the present invention contemplates rotating the mirror 22. Further, one will appreciate that while the grating 20 and/or the mirror 22 may be pivoted to select an optical channel for detection, the receive pigtails or photodetector 30 may be linearly translated to select the optical channel.

Figure 14:
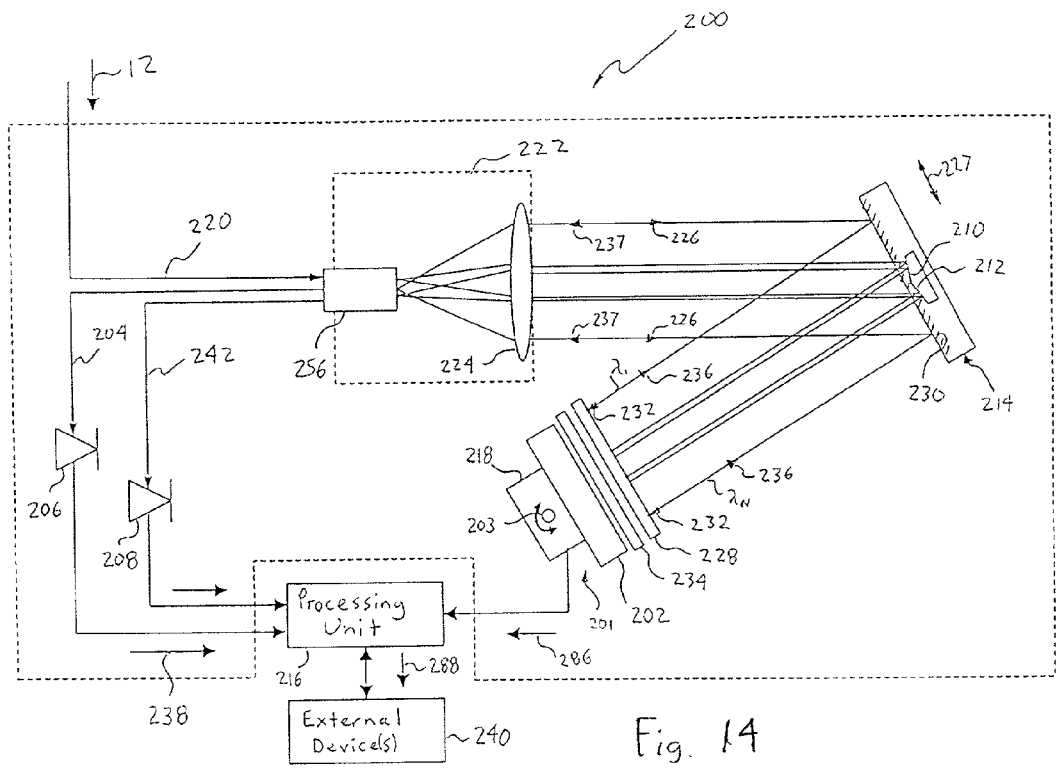
FIG. 14 is a block diagram of another embodiment of a dual pass optical channel monitor in accordance with the present invention.

Referring to FIG. 14, a block diagram of an OCM 200 embodying the present invention is shown. Similar to the OCM 60 shown in FIG. 5, the OCM 200 is a dual pass configuration wherein a pivoting mechanism 201 pivots a reflective element 202 (e.g., a roof prism) about a pivot point 203 within the spectral plane to scan the optical channels 11 of the WDM input signal 12 across the end of an optical waveguide or pigtail 204 to thereby provide each respective channel to a first optical detector 206.

The OCM 200 further includes a second optical detector 208 for sensing light reflecting off a pair of start mirrors 210 and a pair of stop mirrors 212 disposed adjacent to the diffraction grating 214. The start and stop mirrors 210, 212 and the second optical detector 208 provide feedback indicative of the angular position of the reflective element 202 at the start and stop points of its pivot cycle to a processing unit 216, which will be described in greater detail hereinafter. Further in this particular embodiment, an actuator assembly 218 that pivots the reflective element 202 also functions as a position sensor for determining the rotational position of the pivoting mechanism, which will be described in greater detail hereinafter.

An optical fiber or a launch pigtail 220 provides the input signal 12 to a collimator assembly 222. The collimator assembly includes a collimator 224 (i.e., a collimating lens) for collimating the input signal 12 exiting the launch pigtail 220. The focal length of the collimating lens 224, for example, is approximately 40-45 mm, however, the focal length may be appropriate length. The collimating lens may be an aspherical lens, an achromatic lens, a doublet, a GRIN lens, Fresnel lens, a laser diode doublet or any combination of lens. While the collimating lens 224 is illustrated as a single lens one will appreciate the collimating may comprise a plurality of lens, similar to that manufactured by Edmunds Industrial Optics having part number NT332-315.

The collimator assembly 222 images the collimated light 226 onto the diffraction grating 214, which disperses the channels 11 of light onto the reflective element 202 to thereby spectrally separate each of the optical channels 11 of the collimated light in the spectral plane or axis 227. The grating 214 may be similar to those manufactured by Thermo RGL, part number 3325FS-660 and by Optometrics, part number 3-9601. Alternatively, the grating may be formed using holographic techniques, as is well known in the art.

The reflective element 202 reflects the dispersed light 232 back to the diffraction grating 214, as indicated by arrows 236. The diffraction grating 214 further disperses the optical channels 11 of the reflected optical channels and diffracts the optical channels back through the collimator assembly 222 as indicated by arrows 237. The collimating 224 focuses each separated channel of light ($\lambda_1$-$\lambda_N$) at a different focal point in space, as best shown in FIG. 3 and described hereinbefore. One of the optical channels 11 is focused onto the end of the first receive pigtail 204, which guides the optical channel to the first photodetector 206. The pivoting mechanism 201 pivots the reflective element 202 about the pivot point 203 to sequentially or selectively focus each optical channel 11 onto the end of the first receive pigtail 204. The pivoting mechanism 201 thus enables each optical channel of the WDM input signal 12 to be individually detected by the first photodetector 206. The first photodetector then provides a sensed signal 238, indicative of a parameter of the optical channel (i.e. channel power) to the processing unit 216, which interfaces with an external device(s) 240.

As described hereinbefore, one skilled in the art will appreciate that a diffraction grating 214 has a predetermined polarization dependence loss (PDL) associated therewith. Consequently, means to mitigate PDL may be desired. In the embodiment shown in FIG. 14, a $\lambda/4$ plate 228 is disposed between the reflective element 202 and the diffraction grating 214. The fast axis of the $\lambda/4$ plate is aligned to be approximately 45 degrees to the direction or axis of the lines 230 of the diffraction grating, when the grooves or rulings 230 extend perpendicular to the spectral axis 227. The reflective element is angled to reflect the separated channels 232 back through the $\lambda/4$ plate to the diffraction grating.

In the first pass through the $\lambda/4$ plate 228, the $\lambda/4$ plate circularly polarizes the separated light. When the light passes through the $\lambda/4$ plate again, the light is linearly polarized to rotate the polarization of the separated channels by 90 degrees. Effectively, the $\lambda/4$ plate averages the polarization of the light 232 to reduce or eliminate the PDL. While the channel monitor 200 of FIG. 14 comprises a $\lambda/4$ plate, one will appreciate that the $\lambda/4$ plate may not be necessary if the diffraction grating has low polarization dependencies, or other PDL compensating techniques are used.

Alternatively, the present invention contemplates using a tilted glass window to mitigate polarization dependent loss (PDL) in a retro-reflecting, diffraction grating based OCM, similar to the OCM 200 of FIG. 14. A tilted window induces a polarization dependent loss on a transmitted beam. The absolute and relative loss induced by the transmitted beam is defined by the angle of the tilt and refractive index of the tilted window. If the tilted window is placed in the path of the diffracted beam, the various wavelengths will be incident at different angles. Consequently, based on the diffraction of the grating, the various wavelengths are incident at different angles, which results in a wavelength dependent PDL. The wavelength dependent loss of the tilted window is a relatively slow function due to the small angle difference induced by the diffraction grating, and thus to achieve the PDL wavelength dependence, a plurality of tilted windows may be used. While the use of a tilted glass window can be used to compensate for PDL of a retro-reflecting OCM, one will recognize the use of tilted mirror is not limited to a retro-reflecting design.

The reflective element 202 of the OCM 200 comprises a roof prism, which imparts a phase delay on the light beam 232, parallel to the axis of symmetry of the prism. To compensate for the phase delay, a $\lambda/8$ plate 234 may also be disposed between the prism 202 and the diffraction grating 214. If a $\lambda/4$ plate is used to compensate for PDL, the $\lambda/8$ plate is disposed optically between the prism 202 and the $\lambda/4$ plate. The $\lambda/8$ plate is oriented with its fast axis parallel to the axis of symmetry of the prism.

The phase delay of the light beam, which is nominally parallel to the grooves 230 of the diffraction grating 214, is approximately 90 degrees or approximately 45 degrees per reflection. The $\lambda/8$ plate 234 imparts one eighth wave phase delay of approximately 45 degrees on the beam 232 just prior to entering the prism 202 and imparts an additional one eighth wave phase delay on the light beam exiting the prism, resulting in a 90 degrees phase delay equal to the one imparted by the prism. The net phase delay imparted by both the prism and $\lambda/8$ plate at the design wavelength is approximately 180 degrees.

Referring to FIGS. 14 and 16, the OCM 200 provides separate launch and receive pigtails to get the light into and out of the OCM. This is accomplished by reflecting the dispersed light 237 back into the collimating at a slightly different angle than the input signal 226 exiting the collimating lens, thus separating the position of the beam of the dispersed light 237 beam of the input signal 226, which provides the ability to alter the launch and receive pigtails to tailor the system response of the OCM 200, and further eliminates the need for an optical isolator, circulator or coupler at the input of an OCM having a single pigtail, similar to that shown in FIG. 4.

Consequently, the launch pigtail is tailored to function as an input aperture that delivers the input light 12 and tailored to act as a lens (or lens system) to define the divergence of the input light. Conversely, the first and second receive pigtails 204,242 function as a receive aperture that acts as a spatial and angular filter for the retro-reflected dispersed light 237, thus simplifying the opto-mechanical design by eliminating the need to stop all errant rays, such as a light absorbing plate having a slit to pass the light. The characteristics of the launch and receive pigtails, namely the numeral aperture (NA) and core diameter, are tailored to image the input signal 12 and receive the diffracted signal 237. For example, the pigtails may be formed of SMF-28 optical fiber.

It is important to consider the effect of adjacent channels on the diffracted signal 237 when measuring the PVR for very high channel count systems, wherein the non-adjacent channel isolation can greatly affect the performance of the PVR measurement by raising the noise floor of the system. Resolution bandwidth can be increased by increasing the NA of a single mode fiber, thereby reducing the aperture of the receive pigtails 204, 242. The adjacent channel isolation, however, is decreased due to wider cone angle of the receive aperture. Advantageously, the adjacent channel isolation can be increased by decreasing the NA (cone angle) of the receive pigtails. The resolution bandwidth, however, is decreased because the input aperture diameter was increased.

As shown in FIG. 16, the ends of the pigtails 220,204,242 are collapsed or epoxied within a glass capillary tube 256. The ends of the pigtails are spaced vertically in the spatial plane, as indicated by arrow 258. The spacing between the ends of the pigtails is sufficient to provide the necessary optical isolation therebetween. In one embodiment, the launch pigtail 220 is disposed above the receive pigtails 204,242 with the first receive pigtail 204 disposed above the second receive pigtail 242. One will recognize that the ends of the pigtails may be vertically displaced in the spatial axis in any order. As will be described in greater detail hereinafter, the dispersed light 236 received by the first receive pigtail 204 translates in the spectral direction 227 across the first receive pigtail as the roof prism pivots, as indicate by the dashed lines 260. Similarly, the start and stop optical beams received by the second receive pigtail 242 translate in the spectral direction 227 across the second receive pigtail as the roof prism pivots, as indicate by the dashed lines 262.

As shown in FIG. 17, the reflective element 202 comprises a right angle prism to make an optical system less tilt sensitive to separate input and output beams in our collimating lens, thus eliminating the need for an optical isolator. The right angle prism (e.g., roof prism), having light incident on the hypotenuse, provides excellent tilt insensitivity in one direction for beams reflected out of the prism versus a flat mirror. A ninety degree angle prism will reflect light without deviating the wavefront of the beam. However during reflection, small deviations in angle 263 from 90 degrees put an angle error in the two halves of the beam relative to one another equal to $2*a\sin[n*\sin(2*\Delta\theta)]$, where $\Delta\theta$ is the error from a 90 degree angle and n is the refractive index of the prism. The present invention exploits this angle error (for example, 90 degrees 6 minutes) to provide an angle error of the reflected beam equal to that required to have the diffracted signal 237 focus a prescribed distance away from the beam of the input light 226 in the collimator assembly 222, to direct the diffracted signal onto the first receive pigtail 204.

Figure 15:
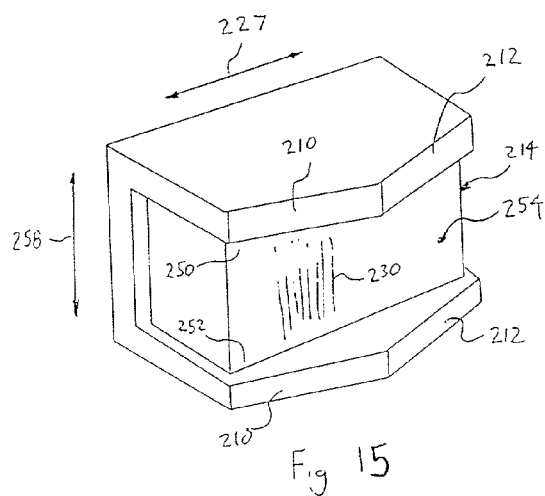
FIG. 15 is a perspective view of a diffraction grating, start mirrors and stop mirrors of the optical channel monitor of FIG. 14, in accordance with the present invention.

The start and stop mirrors 210, 212, respectively provide the OCM 200 with a pair of optical reference signals (e.g., optical pulses 458,460), one of which is indicative of the start position and the other being indicative of the stop position of the scan cycle of the reflective element 202 during the operation of the OCM. A scan cycle is defined by the single sweep of the reflective element. As best shown in FIGS. 15 and 17, when a roof prism is used as the reflective element, one start mirror 210 and one stop mirror 212 are disposed adjacent to the upper portion 250 of the diffraction grating 214 and the other start mirror 210 and stop mirror 212 are disposed adjacent to the lower portion 252 of the diffraction grating.

The angles in the spectral plane 227 (or yaw) of the start mirrors 210 are the substantially the same to reflect a portion of the input light 12 from the launch pigtail 220 to the prism 202 and back to the second receive pigtail 242 when the prism is pivoted to the start position of the scan cycle. Similarly, the angles in the spectral plane 227 of the stop mirrors 212 are the substantially the same to reflect a portion of the input light 12 from the launch pigtail 220 to the prism 202 and back to the second receive pigtail 242 when the prism is pivoted to the stop position of the scan cycle. In one embodiment, the angles of the start and stop mirrors relative to the dispersive surface 254 of the diffraction grating 214 is approximately 29 degrees and 28 degrees, respectively.

Further, the angles in the spatial plane 258 (or pitch) of the upper start mirror and upper stop mirror are substantially the same, and the pitch angles of the lower start mirror and lower stop mirror are substantially the same. However, the pitch angles between the upper and lower mirrors 210,212 are different to receive the portion of the input light 12 and direct the input light to the second receive pigtail 242.

FIG. 17 illustrates the optical path 270 of the outer portion of the input light 12 (the start beam) reflecting off the start mirrors 210 and the roof prism 202, and the optical path 272 of the central portion of the input light 12 (the dispersed light) reflecting off the prism. While only the start beam 270 is shown, one will appreciate that the stop beam travels a similar path between the prism and stop mirrors 212. As shown, an upper portion of the input light 270 reflects off the upper start mirror 210 to a first reflective surface 274 of the prism 202. The first reflective surface 274 of the prism reflects the start beam 270 to a second reflective surface 276 that reflects the light to the lower start mirror 210 to thereby spatially displace the start beam 270. The start beam, which is reflected off the lower start mirror, then passes through the collimator assembly 222 (of FIG. 14) to the second receive pigtail 242, as described hereinbefore. The pitch angle 280 of the upper start mirror reflects the start beam 270 downward onto the first reflective surface 274 of the prism. The pitch angle 281 of the lower start mirror reflects the start beam 270 upward to the second receive pigtail 242. While the pitch angle 280 of the start mirrors 210 are angled to reflect the start beam to the second receive pigtail 242, one will appreciate that the pitch angles may be set such that the start and/or stop beams may be directed to any desired pigtail, including the launch pigtail 220.

Similarly, the central portion of the input light 12 exits the launch pigtail 220 and disperses off the diffraction grating 214 to the first reflective surface 274 of the prism 202 along the optical path 272. The first reflective surface 274 reflects the dispersed light off the second reflective surface 276 of the prism back to the diffraction grating 214. The diffraction grating further diffracts the dispersed light and images the light through the collimating assembly to the first receive pigtail 204 as shown in FIG. 16.

Figure 18:
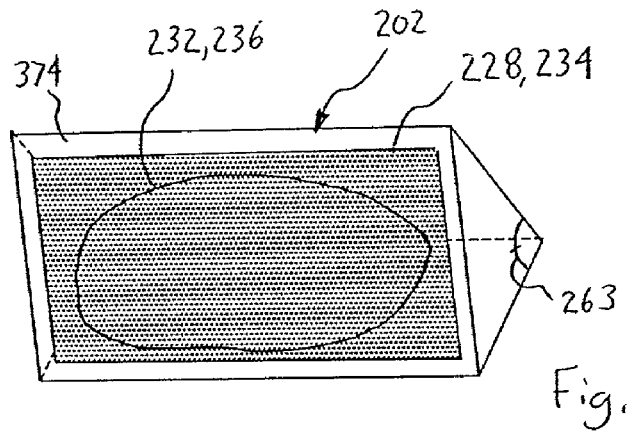
FIG. 18 is a perspective view of a prism and the light imaged thereon in accordance with the present invention.

As shown in FIG. 18, the dispersed light 232 may be spread over a substantial portion of the hypotenuse surface 374 of the prism 202. As described hereinbefore, the return light 26 reflects back to the launch pigtail 220 (as shown in FIG. 5) using a 90 degree prism, or a reflects back to a receive pigtail 204 (as shown in FIG. 14) using a prism with an angle 263 different than 90 degrees.

Figure 19:
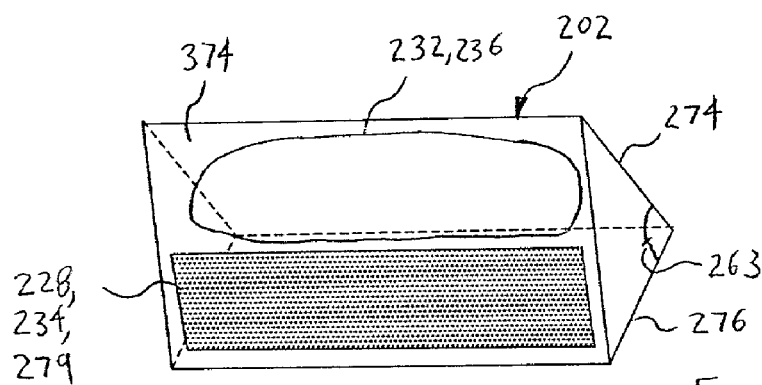
FIG. 19 is a perspective view of a prism and the light imaged thereon of another embodiment of the present invention.
Figure 20:
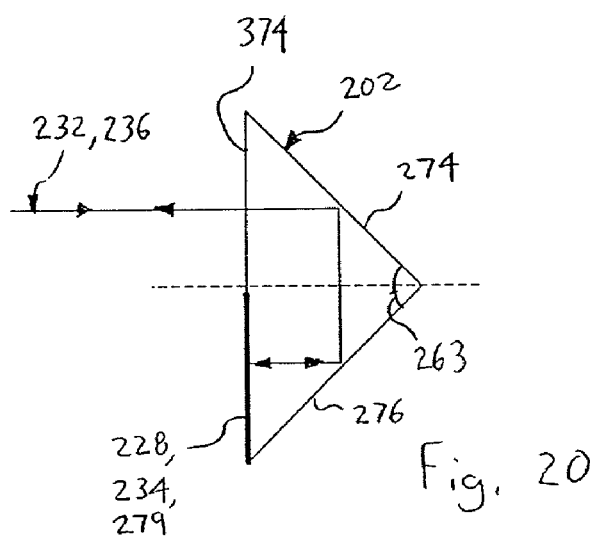
FIG. 20 is a side view of the prism of the embodiment shown in FIG. 19.

Alternatively, as shown in FIGS. 19 and 20, the collimated light 232 may be focused onto an upper portion or half of the prism 202 so that substantially all the light reflects off the upper rear reflective surface 274 to the lower rear reflective surface 276. In this embodiment the prism is a 90 degree prism whereby the light reflecting back through the prism is directed back to the launch pigtail as shown in FIG. 5. A reflector 279, such as a mirror, reflective coating or other reflector is disposed over the lower portion of the surface 374 of the prism 202 to reflect the light back through the prism. Similarly, the $\lambda/4$ plate 228 and $\lambda/8$ plate 234 are disposed on the lower portion of the surface 374 wherein the λ/8 plate is disposed closest to the prism and the reflector 279 is disposed furthest from the prism. Consequently, the light 232,236 will pass through the waveplates 228,234 twice, once as the light 232,236 exits the prism 202 and a second time when reflected back into the prism by the reflector 279, as described hereinbefore. This embodiment reduces the insertion loss of the OCM. While the reflector 279 is shown to be attached or otherwise disposed on the prism, one will appreciate that the reflector may be separate from the prism and waveplates.

Figure 21:
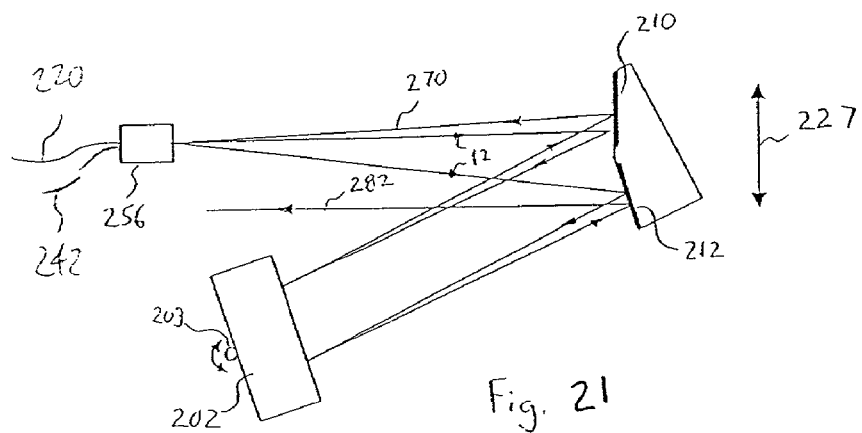
FIGS. 21-23 are schematic diagrams of the optical channel monitor of FIG. 14 illustrating the optical path of the start and stop mirrors during operation.
Figure 22:
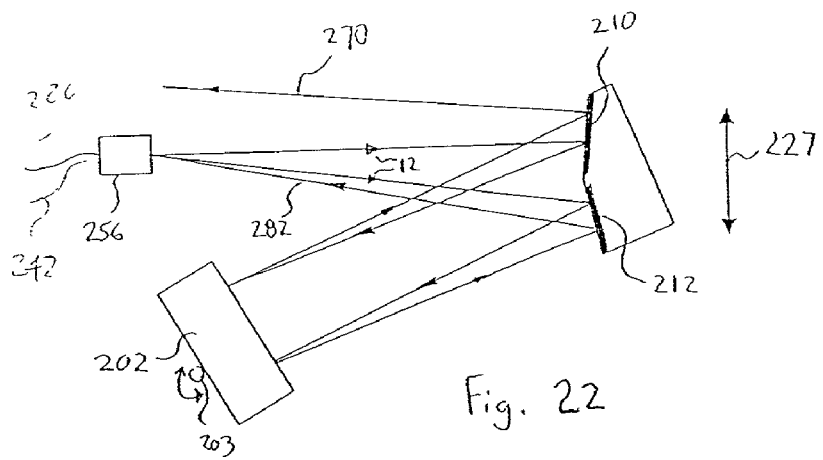
Figure 23:
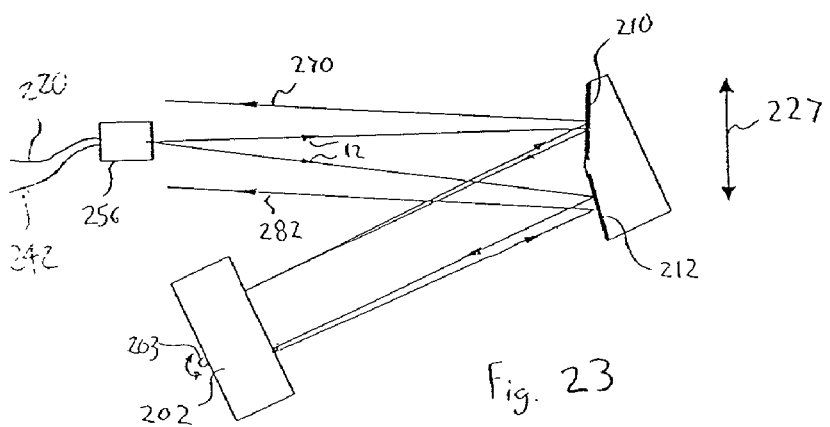

FIGS. 21-23 show a schematic view of the optical paths of the start and stop beams 270,282 during the operation of the OCM 200. A portion of the input light 12 reflects off the start and stop mirrors 210,212 to the prism 202. The start and stop mirrors reflect each respective light beam 270,282 (i.e., portion of the input signal 12) to different focal points spaced in the spectral plane 227. When the pivoting mechanism 201 pivots the prism 202 about pivot point 203, the focal point of the light reflected by the start and stop mirrors 210,212 laterally translate across the second receive pigtail 242 in the spectral plane, as indicated by arrow 227, and illustrated in FIG. 16. The OCM 200 is calibrated such that the start beam 244 reflected by the start mirrors 210 is received by the second receive pigtail 242 when the OCM is at the start of its scanning cycle as shown in FIG. 21, and the stop beam 246 reflected by the stop mirrors 212 is received by the second pigtail when the OCM is at the end of its scanning cycle as shown in FIG. 22.

In FIG. 23, the focal points of the start beam 270 and stop beam 282 are disposed away from the second receive pigtail 242 during the detecting portion of the scan of the spectrum of the input signal 12. As shown, the second receive pigtail 242 does not receive the start nor stop beam 270,280.

Consequently, the start and stop beams 270,282 received by the second receive pigtail 242 generate receptive optical pulses that provide wavelength reference markers disposed before the start position and after the stop position of a cycle of the scan of the OCM 200. The second photodetector 208 generates an output signal indicative of the start and stop optical pulses and provides the output signal to the processing unit 216. The first photodetector 206 provides a sensed signal, indicative of a parameter of the channel (i.e. channel power), to the processing unit 216, which interfaces with external device(s) 240. The feedback provided by the start and stop mirrors close the control loop to enable wavelength drifts from the collimating lens and/or the actuator/sensor to be eliminated. As a result, the system accuracy of the OCM is dependent on angular stability between the diffraction grating and its mount.

As shown in FIG. 14, an actuator assembly 218, such as a pulse drive mechanism 201, drives the pivoting mechanism 201 to pivot the roof prism 202. The back emf of the actuator assembly 218 is provided to the processing unit 216 and used to detect the position or displacement of the prism to thereby accurately track the position of the prism. The back emf of the actuator is related to the velocity of the pivoting mechanism. The processing unit 216 integrates the back emf signal 286 to provide a position signal. The position signal, the start pulse and stop pulse enable the processing unit 216 to associate the sensed optical parameter (i.e., power level) provided by the first detector 206 to its respective optical channel. The processing unit then provides an output signal 288 to the external device(s) 240 that is indicative of the parameter of each optical channel.

Figure 24:
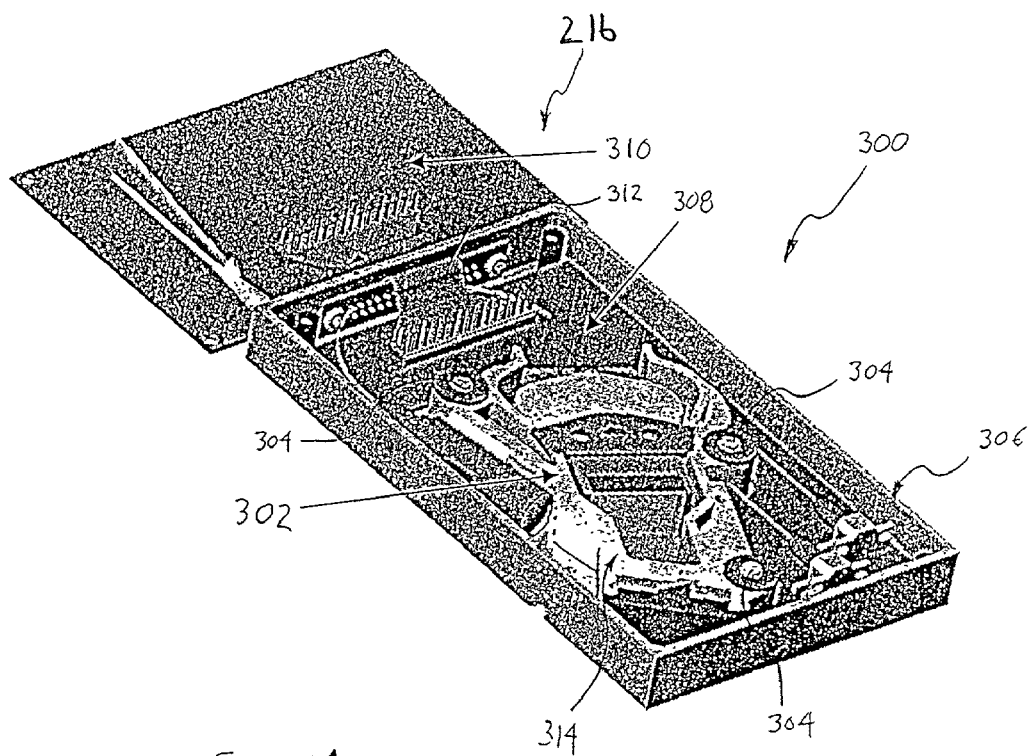
FIG. 24 is a perspective view of a dual pass optical channel monitor as illustrated in FIG. 14.

FIG. 24 illustrates a perspective view of an embodiment of an OCM 300 similar to the OCM 200 shown in FIG. 14, and therefore similar components have the same reference numeral. Each of the optical components of the OCM 300 are mounted to a wedge-shaped subframe 302 that are mounted on a plurality of pins 304 extending from the base of a housing 306. The subframe 302 is suspended on the pins 304 above the base of the housing by a pair of grommets formed of flexible resilient material (e.g., rubber, elastomer) on each pin to dampen the effects of temperature, shock and vibration, as well as strain isolate the subframe from the housing. Alternatively, a single grommet may be used on each pin. The single grommet is disposed centrally within the bore of the subframe 302 to reduce the stiffness of the subframe to the housing.

The processing unit 216 comprises a pair of printed circuit boards (PCBs) 308,310, wherein one PCB 308 is mounted within the housing and the other PCB 310 disposed external to the housing. The two PCBs communicate via a ribbon cable 312 passing through a side wall of the housing via electrical glass to metal sealed pins to provide hermeticity.

Figure 25:
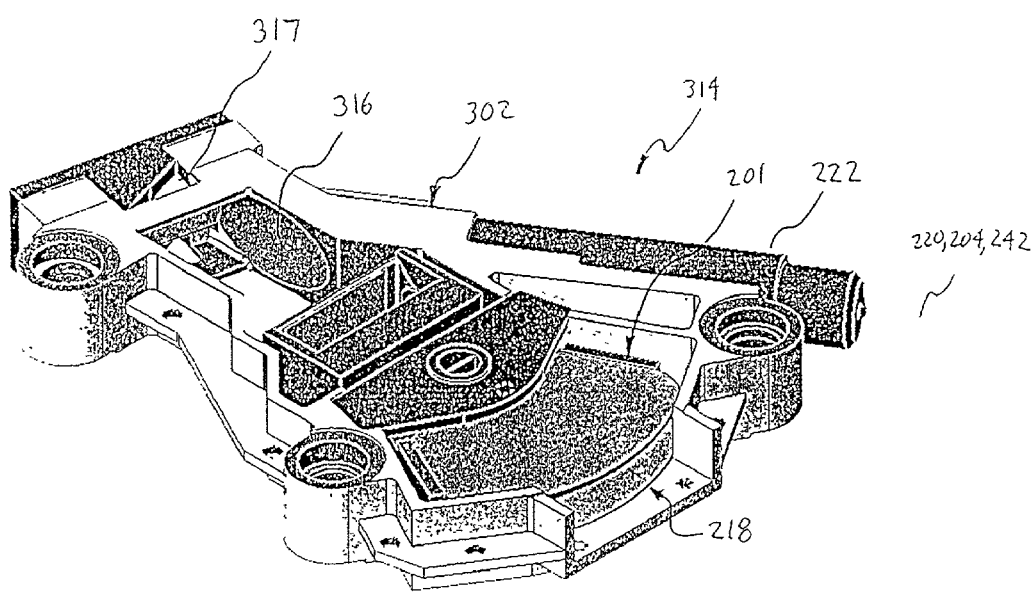
FIG. 25 is a perspective view of the optical sub-assembly of the dual pass optical channel monitor of FIG. 24.
Figure 26:
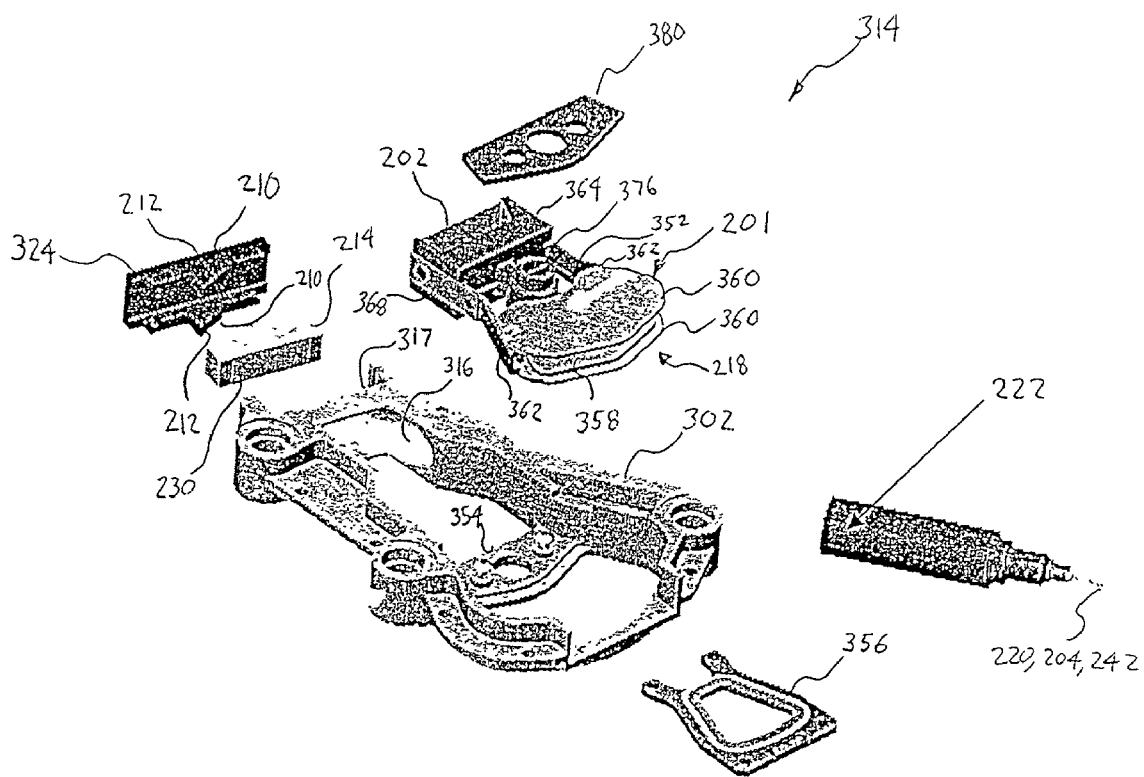
FIG. 26 is an exploded perspective view of the optical sub-assembly of the dual pass optical channel monitor of FIG. 24.

Referring to FIGS. 25 and 26, the collimating assembly 222 and optical pigtails 220,204,242 are mounted to the side of the subframe 302 of the optical assembly 314. The subframe 302 provides a through bore 316 coaxial with the collimated light 226 (see FIG. 14) of the collimating assembly 222 for passing the collimated light from the collimating assembly. The grating 214 is mounted within a cavity 317 disposed at one end of the subframe 302 and aligned to receive the collimated light from the collimator assembly.

Figure 27:
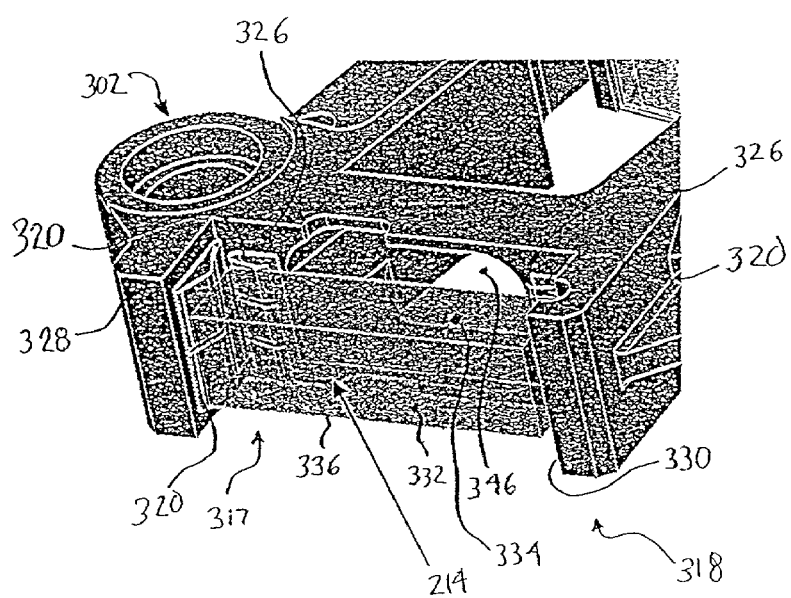
FIG. 27 is a perspective view of the grating mount assembly of the optical sub-assembly of the dual pass optical channel monitor of FIG. 24.
Figure 28:
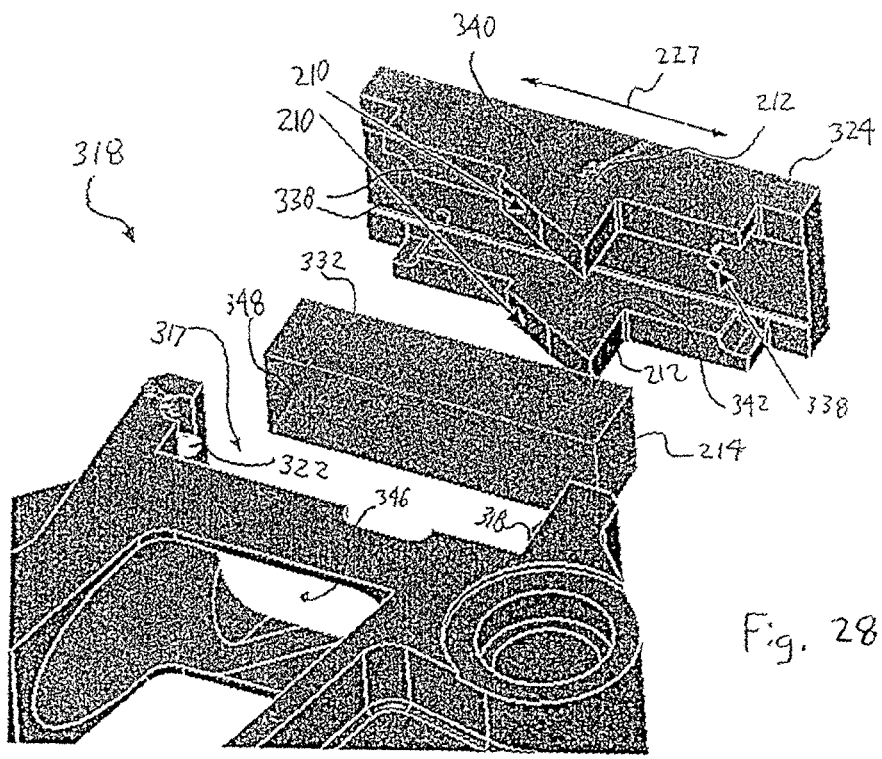
FIG. 28 is an exploded perspective view of the grating mount assembly of the optical sub-assembly of the dual pass optical channel monitor of FIG. 24.

FIGS. 27 and 28 illustrate an all-mechanical, epoxy-free mount for the diffraction grating 214 that provides kinematic interfaces to minimize distortion of the optical characteristics of the grating. The integrated grating mount 318 minimizes interfaces, size and the number of parts. The grating mount 318 is also fabricated to hold positional tolerances to minimize or eliminate the need to adjust the grating during assembly. The diffraction grating 214 is secured in the cavity 317 with a plurality of fingerstock springs 320, a cylindrical pin 322 and a grating mount 324 to maintain the diffraction grating 214 in a fixed orientation. Specifically, the fingerstock springs 318 are secured to the forward walls 326 and a sidewall 328 that define the cavity 317. The cylindrical pin 322 is mounted within the other sidewall 330 to provide a cylindrical lateral interface that provides a stable interface for the grating 214 to maintain the grating parallel to the spectral axis, as indicated by arrows 227. The fingerstock springs 320 mounted to the side walls press the grating firmly against the cylindrical pin 322.

The grating mount 324 is generally U-shaped for supporting the rear surface 332 of the grating 214 and the upper and lower surfaces 334,336 thereof. The rear surface of the grating mount includes three protrusions or embedded pins 338 extending inwardly to engage the rear surface of the grating to provide a 3-point interface with the grating. The fingerstock springs 320 mounted to the forward walls press the grating firmly against the embedded pins 338. Prior to mounting the grating to the subframe, the grating surface is ablated around the outer periphery to remove the epoxy (or soft material) to provide a hard surface to engage the springs 320 mounted to the subframe.

The grating mount 324 is welded to the subframe 302 for maximum stability. In this embodiment, the start mirrors and stop mirrors 210,212 are integrally formed in the upper and lower walls 340,342 of the grating mount 324. The forward wall 326 has an opening 346 therein to permit the collimated input light from the collimating assembly 222 to be imaged onto the grating surface 348.

Figure 29:
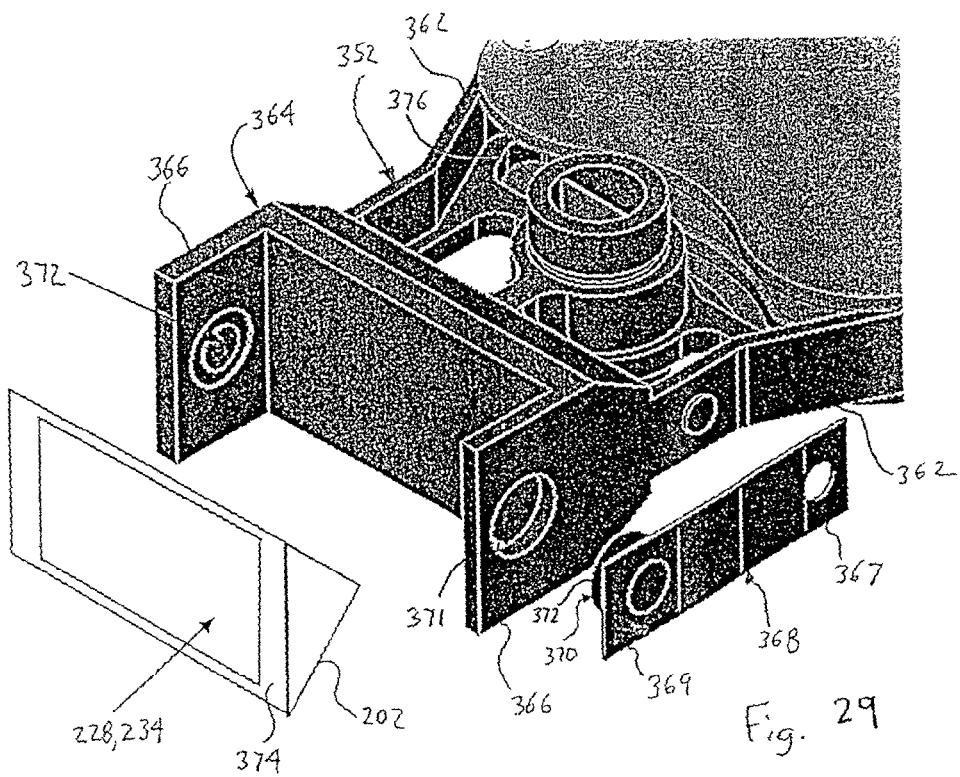
FIG. 29 is an exploded perspective view of the prism mount assembly of the optical sub-assembly of the dual pass optical channel monitor of FIG. 24.

As best shown in FIGS. 26 and 29, the pivoting mechanism 201 is a balanced system comprising an actuator assembly 218 and a pivot subframe 352 pivotally mounted to a cross member 354 of the optical subframe 302. The actuator assembly 218 is a magnetic pulse drive that includes a coil 356 and a permanent magnet 358 disposed between a pair of metal plates 360. The magnet and the plates are mounted between a pair of arms 362 of the pivot subframe 352, while the coil 356 is mounted to the optical subframe 302 between the magnet and a plate 360. A U-shaped bracket 364 for retaining the prism 202 is mounted or formed at the other end of the pivot subframe 352, opposite the actuator assembly 218. The prism is secured between the sidewalls 366 of the grating bracket 364 by a welded leaf spring 368.

As best shown in FIGS. 25 and 26, the actuator assembly 292 is a resonant system comprising an actuator 294, such as a magnetic pulse drive. For every cycle of the scan, the actuator provides a magnetic pulse to oscillate the actuator assembly and the prism 202 between the start and stop positions at the mechanical resonance of the pivoting mechanism 201. A controller periodically generates the drive pulse and varies the current through the coil and pulse length in response to the back emf of the actuator and the feedback from the start/stop mirrors to maintain the frequency and amplitude of the scan. An advantage of the actuator assembly functioning as a resonant system is that the actuator assembly consumes low power and provides good vibration conditions. While a magnetic pulse is provided at each cycle of the scan, one will appreciate that the magnetic pulse be provided at any time to oscillate the pivoting mechanism 202 at the desired frequency.

One end 367 of the leaf spring 368 is secured to the pivot subframe 352 and the opposing free end 369 includes a cylindrical contact 370 that extends through a hole 371 in the side wall of the bracket to engage the prism 202. An epoxy film adhesive 372 is used to secure the prism to the contact 370 and the opposing sidewall. The epoxy preform 372 is used for precise volume control during manufacture and repeatable low level distortion to the optical characteristics of the prism. The local epoxy bond region also allows glass to metal contact during the curing process, which provides for precision positioning. Advantageously, the leaf spring 368 fixtures the prism 202 and allows for differential thermal expansion that may distort the optical characteristics of the grating and still provide additional support during the mechanical shock event. Prior to mounting the prism 202 to the pivoting mechanism 201, the λ/4 plate 228 and the λ/8 plate 234 are bonded to the front surface 374 of the prism 202.

A flex pivot 376, such as a Bendix pivot, is approximately centrally secured to the pivot subframe 352. The axial ends of the flex pivot are mounted to the cross members 354,380 of the optical subframe 302. Advantageously, the flex pivot 376 is flexible to permit the pivotal rotation in the spectral plane 227, but stiff in the spatial axis 258. This characteristic advantageously reduces the tilt sensitivity in the spectral plane of the OCM 300.

Figure 30:
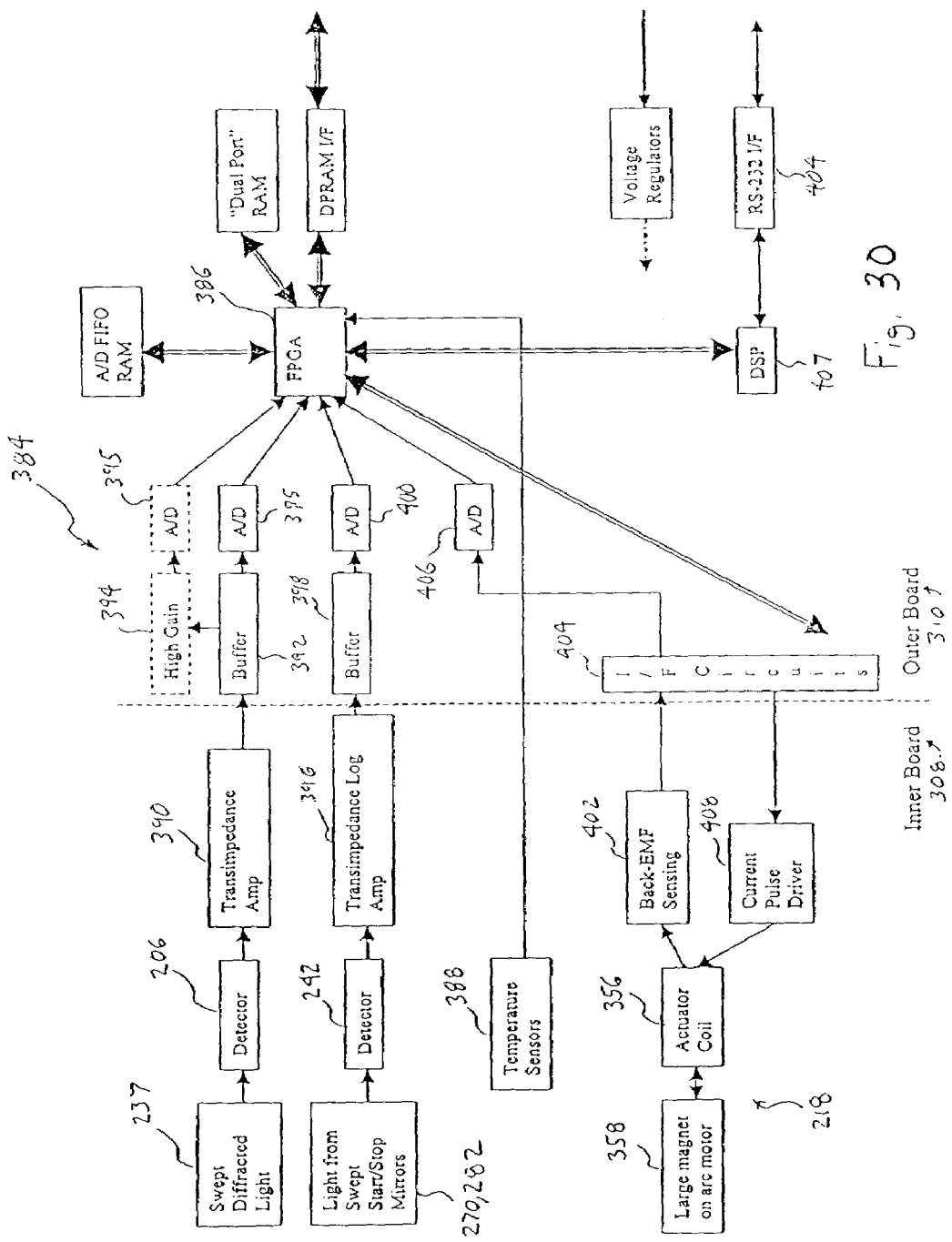
FIG. 30 is a block diagram of the electronic architecture of the optical channel monitor of FIG. 24.

In FIG. 30, an exemplary embodiment of the electronic architecture 384 of the present invention is shown. A field programmable gate array (FPGA) 386 receives input signals from the first photodetector 206, the second photodetector 242, and at least one temperature sensor 388; and a signal indicative of the back emf of the actuator assembly. A transimpedance amplifier or logarithmic amplifier 390 amplifies the output signal 238 of the first detector 206. The amplifier signal is provided to a high gain buffer 392 and a low gain buffer 394 which is converted to a digital signal by a pair of respective 14 bit analog to digital converters (A/DC) 395. The digital output signals of the A/DCs 395 are then provided to the FPGA 386. Similarly, a transimpedance logarithmic amplifier 396 amplifies the output of the second detector 242. The amplified signal is provided to a buffer, wherein the output signal is converted by an A/DC 400. The digital output signal of the A/DC 400 is then provided to the FPGA 386. The output of the temperature sensors 388 are multiplexed and provided to the FPGA 386 to compensate for drift or other temperature dependent errors. The data collected by FPGA is provided to the processor or digital signal processor (DSP) 407.

The control loop of the actuator assembly 218 includes circuitry 402 for detecting the back emf of the actuator 356, which provides this feedback to the processor 407 through interface circuitry 404, an A/DC 406 and the FPGA 386. The processor integrates the back emf signal to determine the position of the actuator 218. In response to the back emf, the start/stop signals and an actuator algorithm, the processor 407 provides a signal to a current pulse driver 408 through the interface circuit 404, which provides a drive signal having the desired amplitude to maintain rotational velocity of the pivoting mechanism 201. As described hereinbefore, the processor periodically provides the drive signal at the mechanical resonance of the pivot mechanism 201, which defines the scan cycle of the OCM 300.

While the position feedback of the prism 202 is provided by the back emf of the actuator 356, one will appreciate that a separate position sensor (not shown) may be used as described hereinbefore (e.g., a giant magnetic resistive (GMR) or capacitive sensor). The output of a separate position sensor is provided to position sensing circuitry, which generates a position output signal. An A/DC 406 converts the position output signal and provides the digitized signal to the processor 407. The processor 407 further includes communication circuitry 404 for interfacing with the external devices 240.

The optical channel monitor 300 of FIG. 24 advantageously provides an accurate, cost effective optical channel monitor. The channel monitor 300 provides power resolution of approximately 0.1 dB with a power repeatability of approximately +/−0.2 dB. The absolute wavelength accuracy is +/−120 pm with a power accuracy of +/−0.5 dB. The channel power dynamic range is −10 to −40 dBm. The wavelength band covers at least the C-band and L-band of the ITU grid. The monitor can detector input signals having a minimum channel spacing of at least 50 GHz. The channel monitor also has a relatively small form factor (e.g., approximately 5.7 in.×11.5 in. by 0.7 in.) compared to other optical channel monitors.

Figure 31:
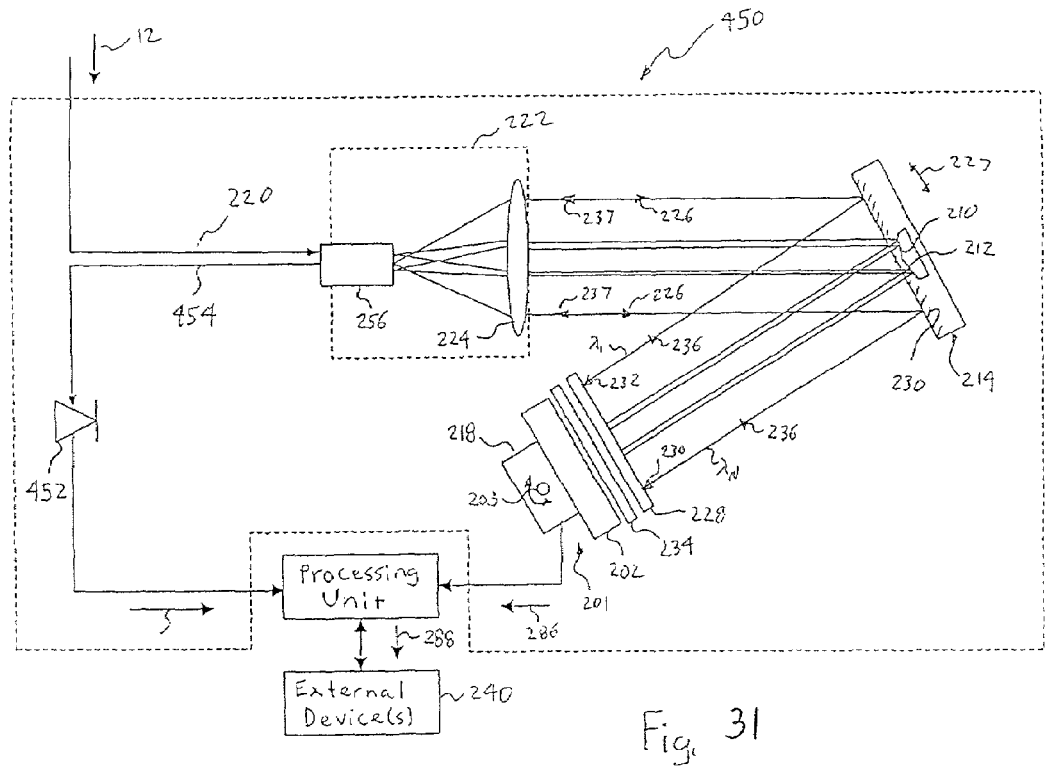
FIG. 31 is a block diagram of another embodiment of a dual pass optical channel monitor in accordance with the present invention.

FIG. 31 illustrates another exemplary embodiment of an OCM 450, which is similar to the OCM 200 of FIG. 14, except the OCM 450 includes a single optical detector 452 for sensing both a parameter of the input signal 12 and the start and stop pulses reflecting off the respective start and stop mirrors 210,212. Consequently, only two pigtails 220,454 are provided, however, an optical coupler or a three port circulator (not shown) may be provided at the input pigtail 220 to reduce the number pigtails to one.

When a single optical detector 452 is used, preferably the spectral position of the start and stop pulses 458,460 may be located sufficiently outside of the spectral range of the WDM signal 462 to not effect the power or shape of the optical channels 11. For example, FIG. 32 illustrates a plot of the output signal 464 of the optical detector 452, wherein the start and stop pulses 458,460 are disposed outside the spectral range of the optical channels 11 of the input signal 12 as denoted by the dashed lines 466.

Figure 33:
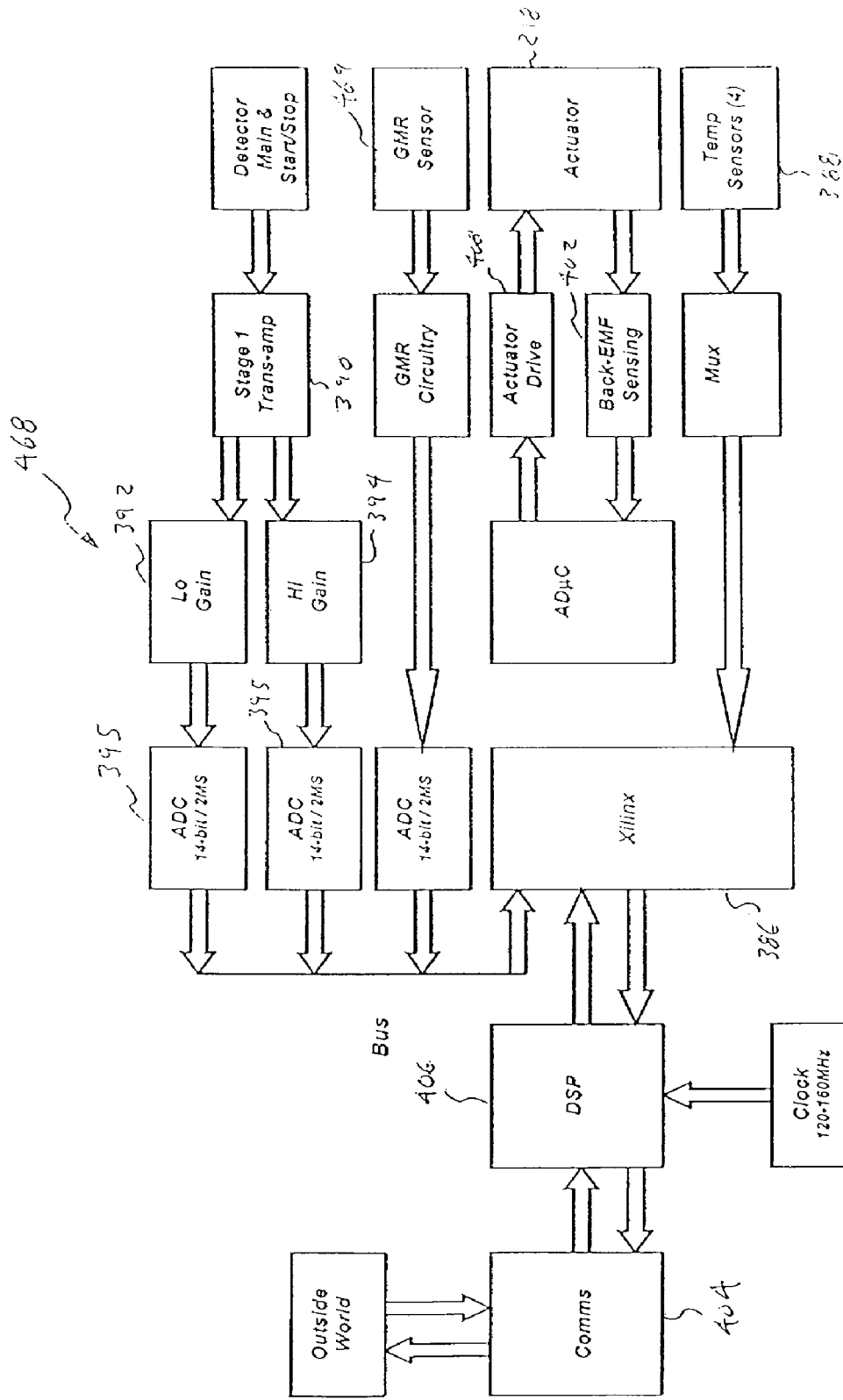
FIG. 33 is a block diagram of the electronic architecture of the optical channel monitor of FIG. 31.

FIG. 33 illustrates a block diagram of an exemplary embodiment of the electronic architecture 468 of the OCM of FIG. 31 wherein positional feedback of the prism is provided by a GMR sensor 469 (or other discrete position sensor).

Figure 34:
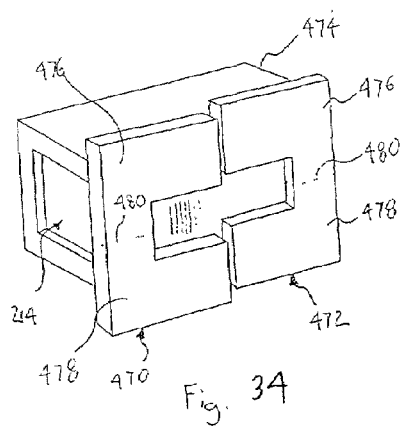
FIG. 34 is a perspective view of another embodiment of a diffraction grating, start mirrors and stop mirrors of the optical channel monitor of FIG. 14, in accordance with the present invention.
Figure 35:
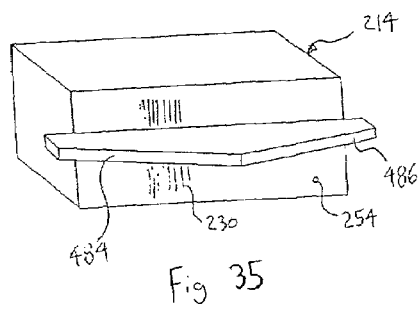
FIG. 35 is a perspective view of another embodiment of a diffraction grating, start mirrors and stop mirrors of the optical channel monitor of FIG. 14, in accordance with the present invention.

FIGS. 34 and 35 illustrate other embodiments for start and stop mirrors 470,472 used in combination with the reflective element 202, particularly the roof prism 202. In FIG. 34, the start mirror 470 and stop mirror 472 are each formed of a unitary U-shaped reflective element, such as a mirror, which are secured to the grating mount 474 at yaw angles similar to that described hereinbefore for the embodiment of the start and stop mirrors 210,212 of FIG. 15. Each U-shaped mirror provides an upper and lower reflective surface 476,478 to direct a portion of the input signal 12 to the prism 202 and receive that light from the prism. The upper and lower reflective surfaces of each respective start and stop mirror are coplanar, having no pitch angle. In this embodiment, the start and stop mirrors are directed to the same detector as the optical channels as shown in FIGS. 31 and 32.

One will appreciate, however, that each respective start and stop mirror 470,472 may be formed of separate upper and lower mirrors, as indicated by the dashed line 480, to enable the pitch angle of the upper and lower mirrors to be set to direct the reflected light to a desired receive pigtail, as described hereinbefore regarding the embodiment of the start and stop mirrors 210,212 of FIG. 15.

In FIG. 35, the present invention contemplates a single start mirror 484 and a single stop 486 mirror for reflecting a portion of the input light in substantially the same optical path. For example, the start and stop mirrors, having yaw angles similar to that described hereinbefore, are mounted to the grating surface 254 of grating 214 or in front of the grating. The start and stop mirrors 484,486 are disposed in the spectral plane at the midpoint of the prism 202, such that the light directed to the prism reflects back to the mirrors along substantially the same optical path.

While most of the embodiments of the start and stop mirrors 210,212 described hereinbefore have upper and lower reflective surfaces (or mirrors) when used with a prism 214, one will appreciate that a single start mirror and a single stop mirror may be used when the reflective element 214 comprises a flat reflective surface (e.g., a mirror).

Further, one will recognize that only one mirror (e.g., a start mirror(s) or a stop mirror(s)) may be used to provide adequate position feedback of the optical assembly of the OCM 200, provided the OCM includes a position sensor (e.g., GMR, capacitive device, stop switch, encoder or other sensors described hereinbefore) having a substantially linear or known, stable response. In other words, any one of the start mirror(s) or stop mirror(s) may be substituted for a mechanical or electrical position sensor.

Figure 36:
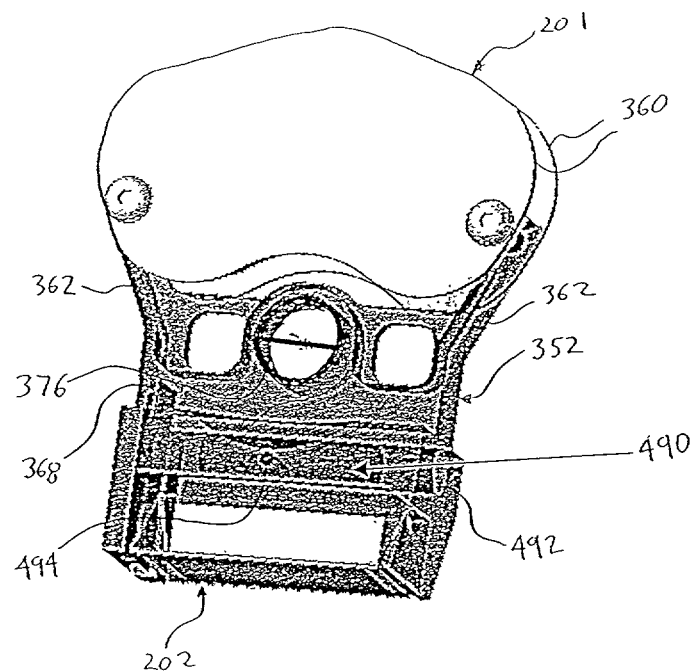
FIG. 36 is a perspective view of another embodiment of the actuator and prism mount of the optical sub-assembly of the optical channel monitor of FIG. 14, in accordance with the present invention.

As described hereinbefore, the actuator assembly 201 is a resonant system that pivots about a flex pivot 376. As shown in FIG. 36, the actuator assembly includes relatively heavy magnet 358 (see FIG. 26) and plates 360 disposed at one end of the optical subframe 352 that causes an imbalance on one side of the flex pivot 376. To counterbalance the actuator assembly, the present invention contemplates adding a counterweight 490 to the other end of the optical subframe. The optical subframe 352 has a bore 492 for receiving a cylindrical counterweight or plug of material 490. The counterweight may be of any material (e.g., metal, alloy, densalloy, and plastic) that is sufficient to counter balance the weight of the actuator assembly. The length of the counterweight is less than the length of the bore to enable the location of the counterweight to be adjusted within the bore. After the optical assembly is balanced, the counterweight is secured within the bore such as by epoxying or welding the counterweight therein. The optical subframe 352 may also include a hole 494 extending radial from the bore 492, that enable epoxy to be injected into the bore or means to laser weld the counterweight to the optical subframe.

Figure 37:
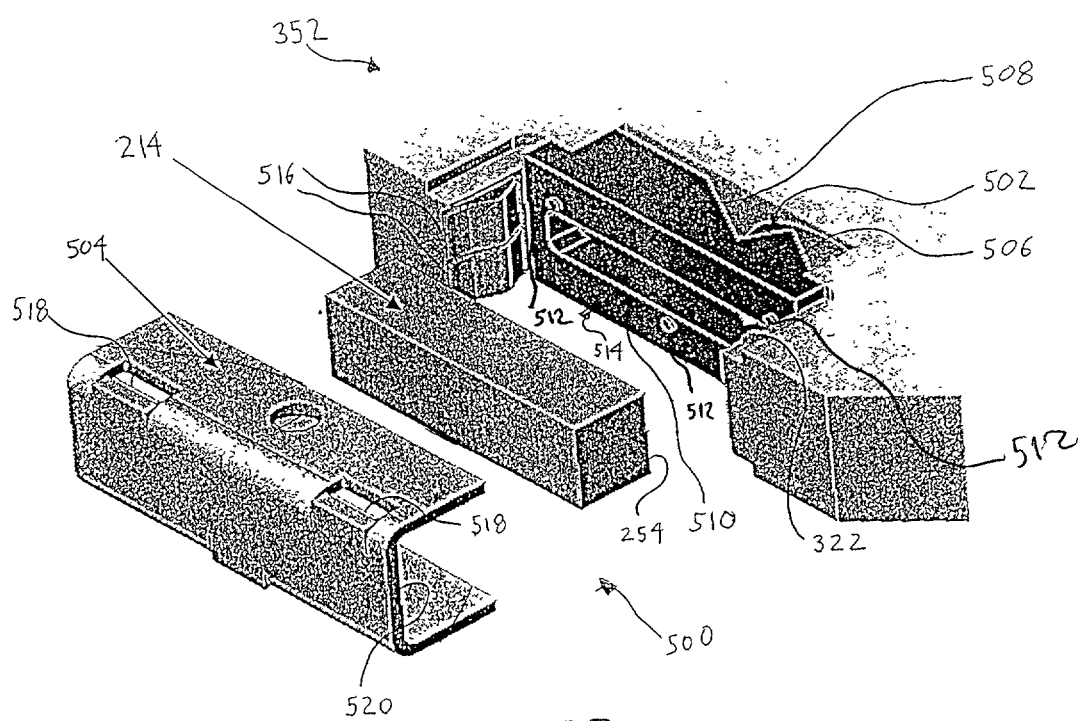
FIG. 37 is an exploded, perspective view of another embodiment of the grating mount assembly of the optical channel monitor of FIG. 14 in accordance with the present invention.
Figure 38:
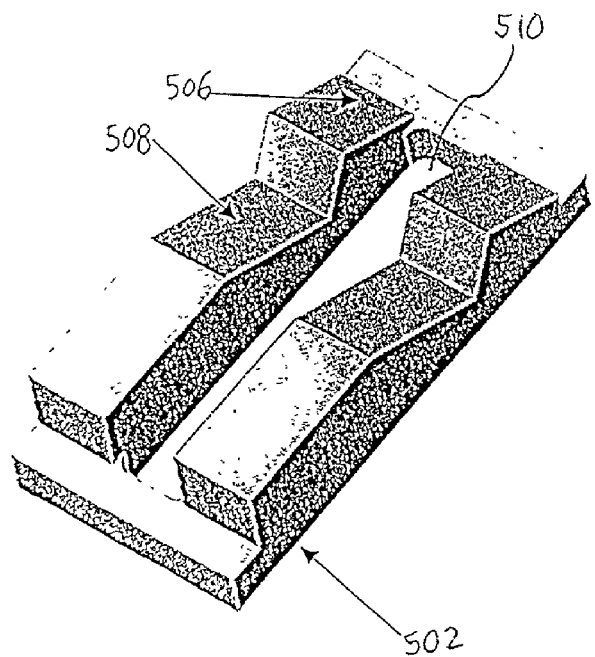
FIG. 38 is a perspective view of a front support plate of the grating mount assembly of FIG. 37 that includes the start and stop mirrors.
Figure 39:
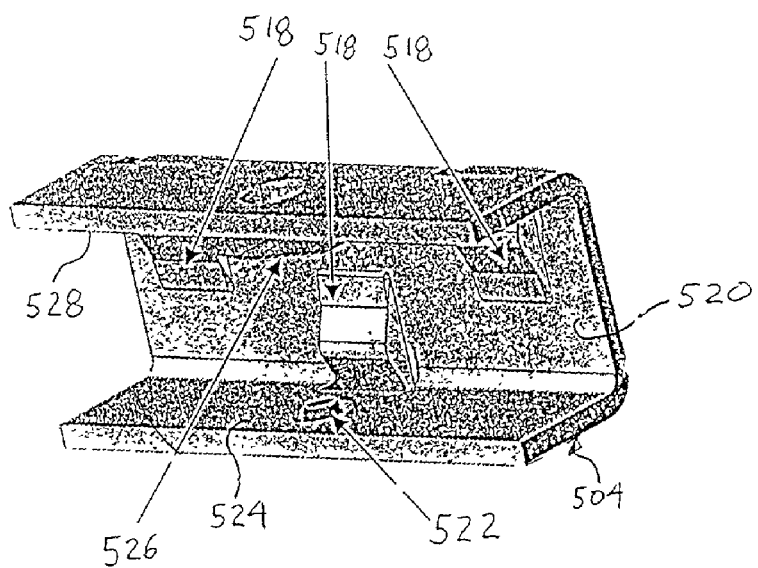
FIG. 39 is a perspective view of a bracket of the grating mount assembly of FIG. 37.

FIG. 37 illustrates an exploded, perspective view of another embodiment of a grating mount assembly 500 in accordance with the present invention. Advantageously, the grating 214 mount assembly provides kinematic interfaces in all axes of movement to maintain the grating in a fixed position relative to the optical subframe 352, and thereby reduces the effects caused by shock and vibration to the OCM 200. As shown in FIGS. 37-39, the grating mount assembly 500 includes a front support plate 502 and U-shaped bracket 504. The start mirrors 506 and the stop mirror 508 are formed on front surface of the support plate 502. The support plate includes a generally rectangular opening 510 to permit light to pass to and from the ruled surface 254 of the grating 214. The start/stop mirrors may be formed by grinding, polishing and plating the mirrors to provide accurately angled mirrors. The start/stop mirrors may also be gold coated to reduce optical loss.

The support plate 502 also has three protrusions or embedded pins 512 extending from the rear surface 514 of the support plate for engaging the ruled surface 254 the diffraction grating 214. The support plate is welded to the optical subframe 352. Similar to the grating mount assembly 324 of FIG. 28, a cylindrical pin 322 is secured vertically within a side wall of the optical subframe and a pair of fingerstock springs 516 are mounted in the opposing side wall to retain and force the grating against the cylindrical pin. Similarly, as best shown in FIG. 39, three fingerstock springs 518 are mounted to the inner surface of the rear wall 520 of the bracket 504 to retain and force the grating 214 against the pins 512 disposed in the rear surface 514 of the support plate 502. The fingerstock springs 518 are positioned on the bracket to oppose a respective pin when secured to the optical subframe. Prior to mounting the grating to the subframe, the grating surface is ablated around the outer periphery to remove grating portion, typically formed of epoxy or other relatively soft material, to provide a hard surface to engage the embedded pins 512 of the support plate 502.

The bracket further includes a kinematic ball 522 (e.g., pin, protrusion, flatten ball) attached or embedded within the lower wall 524 (or upper wall 528) of the bracket 504 to engage and support the grating. A fingerstock spring 526 is mounted to the upper wall of the bracket opposite the ball 522 to retain and force the grating against the ball. The spring and ball are located on the bracket to be substantially centered on the grating. While fingerstock springs 516,518,526 have been described to retain the grating, one will recognize that any resiliently flexible device, element or material may be used.

Figure 40:
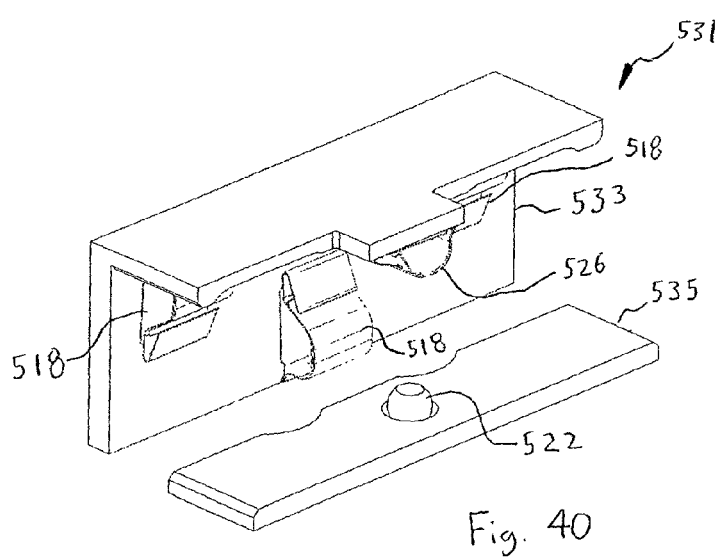
FIG. 40 is an exploded, perspective view of another embodiment of a bracket for retaining a grating in accordance with the present invention.

FIG. 40 illustrates another embodiment of a bracket 531 for retaining the grating 214 which is similar to the bracket 504 of FIG. 39 and therefore, similar components have the same reference numerals. To provide easier manufacturing and assembly, the bracket 531 comprises an L-shaped portion 533 and a lower portion that when welded together form a similar U-shaped bracket as shown in FIG. 39.

Figure 41:
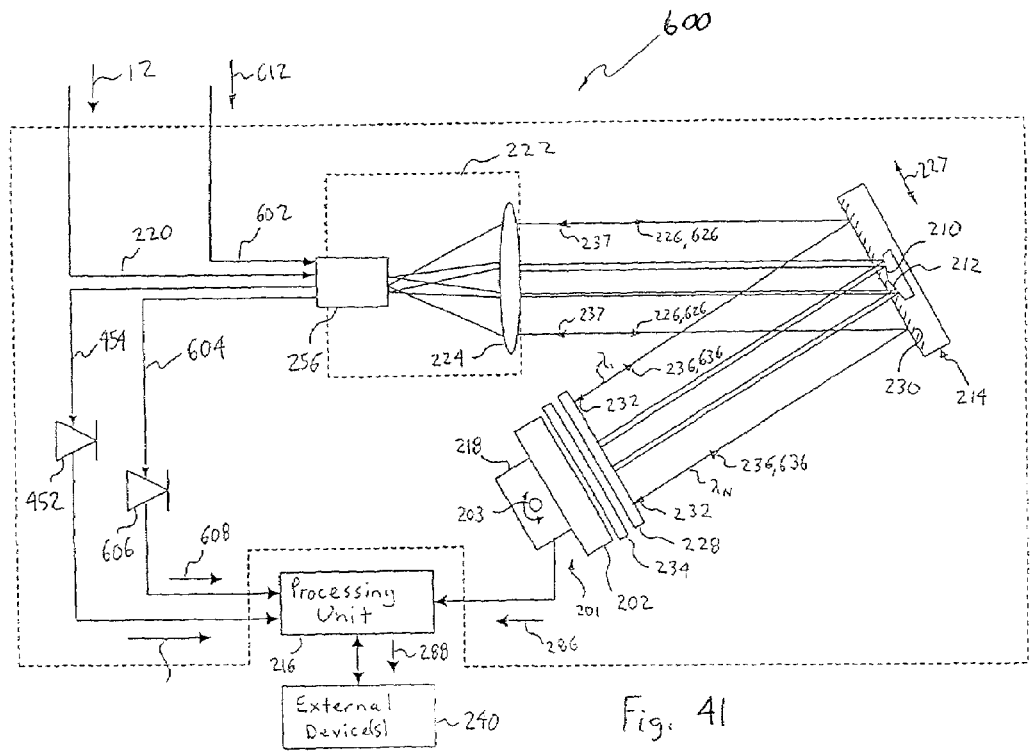
FIG. 41 is a block diagram of a dual pass optical channel monitor including a pair of optical channel monitors in accordance with the present invention.

FIG. 41 illustrates another embodiment of an OCM 600 similar to the OCM 450 of FIG. 31, wherein the OCM 450 includes a single optical detector to sense both the diffracted input signal and the start and stop input pulses. The OCM 600 includes at least two OCMs that use a significant number of the same components. The OCM 600 is substantially the same as the OCM 450 except the OCM 600 further includes a second launch pigtail 602, a second receive pigtail 604, a second photodetector 606 and complementary software to process the second detected signal 608. In the operation of the OCM 600, first and second input signals 12, 612 propagate through respective launch pigtails 220, 602 to the collimating assembly. The collimated light 226,626 of each input signal is imaged and spatially separated on the diffraction grating 214. The grating diffracts both collimated light onto the prism 202, which reflects the diffracted beams 236,636 back to the grating. The grating 214 further diffracts both beams to the collimating assembly 222 which focuses the light beam of the first OCM to the first receive pigtail 454 and the light beam of the second OCM to the second receive pigtail 604.

The corresponding first and second photodetectors 452, 606 provide respective optical signals to the processing unit 216, which are indicative of an optical parameter of the selected channel of each respective input signal 12,612. The start and stop mirrors 210,212 function substantially the same as described hereinbefore. One will recognize that the start and stop pulses are provided to only one of the receive pigtails 454,604.

Figure 42:
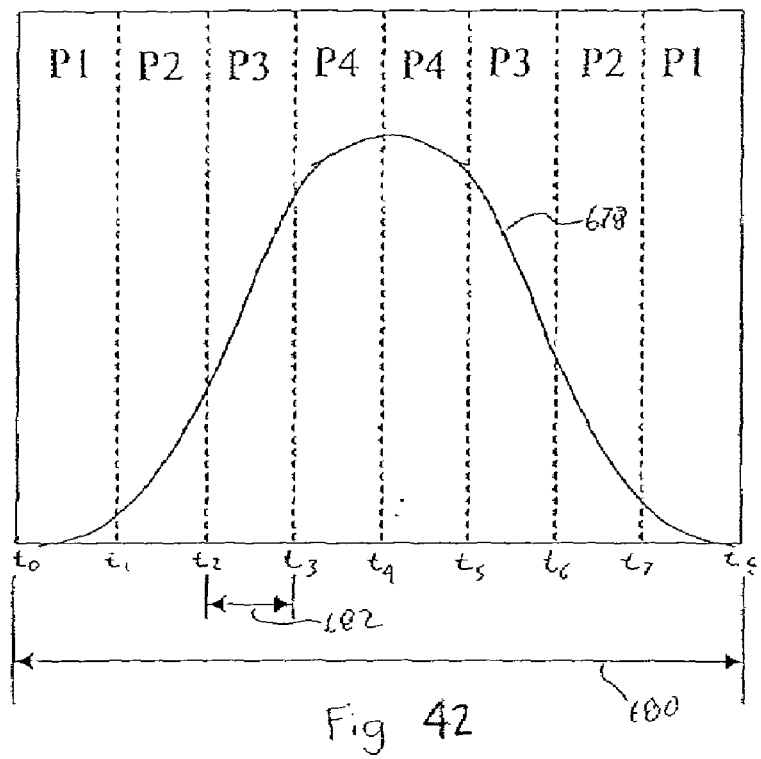
FIG. 42 is a graphical represent of the scanning cycle of an optical channel monitor in accordance with the present invention.

FIG. 42 is illustrative of a complete cycle 678 of the oscillation of the pivot mechanism 201 (e.g. the prism) of the optical channel monitor 200 of FIG. 14, for example. The period of time 680 between $t_0$ to $t_8$ represents the time the pivot mechanism 201 pivots from its initial position at $t_0$ to the maximum pivot position at $t_4$ and back to its initial position at $t_8$. In an exemplary embodiment, the dispersed input signal is received by the receive pigtail 206 during a portion 682 (i.e., $t_2$-$t_3$) of the half cycle of the oscillation of the pivot mechanism. The rate or frequency of sensing the input signal 12 may be doubled by detecting and processing the input signal received by the receive pigtail 206 as the pivot mechanism 201 rotates in both the clockwise and counterclockwise direction during the time periods of $t_2$-$t_3$ and $t_5$-$t_6$. An exemplary time period 680 to oscillate the optical sub-assembly a complete cycle is approximately 50 ms, however, one will appreciate that may be tuned or driven to oscillate at a faster or slower rate.

Figure 43:
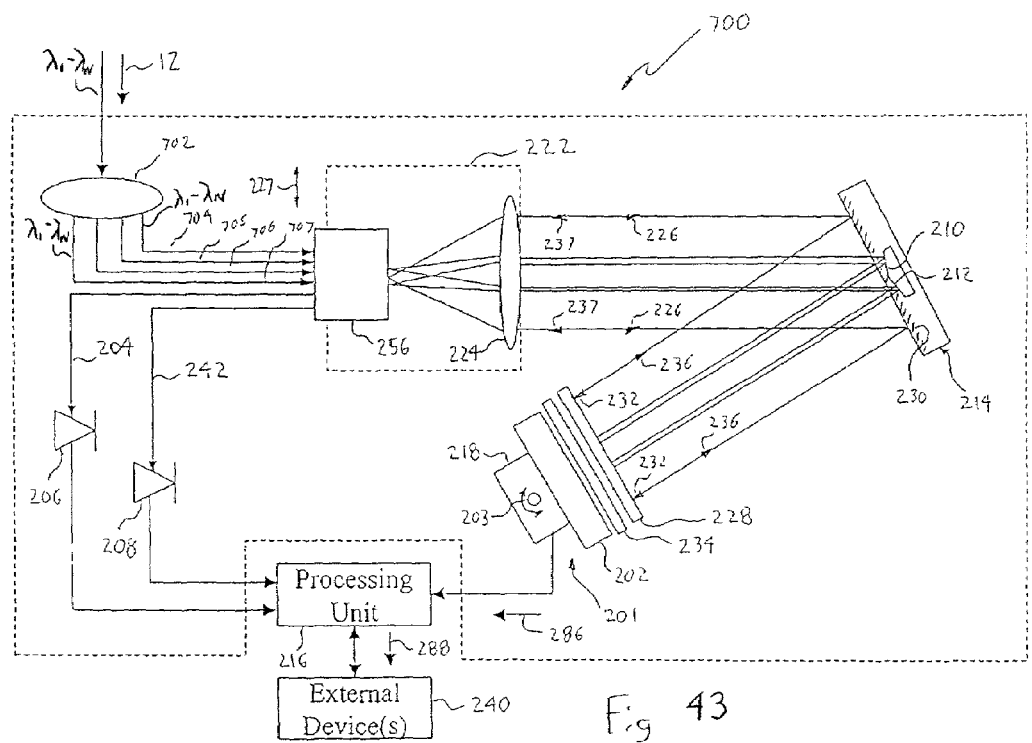
FIG. 43 is a block diagram of another embodiment of a dual pass optical channel monitor in accordance with the present invention.

FIG. 43 illustrates another embodiment of an OCM 700 that is substantially similar to the OCM 200 of FIG. 14, except an optical splitter 702 and four launch pigtails 704-707 provide the input signal 12 to the plurality of launch pigtails. The optical splitter 702 provides a portion of each optical channel ($\lambda_1$-$\lambda_N$) of the input signal 12 to each of the launch pigtails 704-707. The free-ends of the each launch pigtail 704-707 are spaced in the spectral direction 227 to thereby sequentially project all four of the input channels 11 onto the grating 214 in the spectral direction as shown in FIG. 3. Consequently as the pivot mechanism 201 pivots from the initial position at $t_0$ to the end of a half cycle at $t_4$, each optical channel 11 of the input signal 12 will be scanned across the receive pigtail 206 four times, and then detected and processed. When the pivot mechanism 201 returns to its initial position at $t_8$, each of the input signals projecting from the launch pigtails 704-707 may be detected and processed a second time. Advantageously, the additional launch pigtails 704-707 increase the detection rate of the input signal 12 by four times without increasing the pivot rate of the pivot mechanism. Consequently, the optical channels ($\lambda_1$-$\lambda_N$) of the input signal 12 are scanned eight times over one scanning cycle.

As shown in FIG. 42, the output of each launch pigtail 704-707 is detected over a respective time period, as denoted by P1-P4; wherein the time period P1 represents the period the input light 12 (channels $\lambda_1$-$\lambda_N$) from the first launch pigtail 704 is detected, the time period P2 represents the period the input light (channels $\lambda_1$-$\lambda_N$) from the second launch pigtail 705 is detected, the time period P3 represents the period the input light (channels $\lambda_1$-$\lambda_N$) from the third lunch pigtail 706 is detected, and the time period P4 represents the period the input light (channels $\lambda_1$-$\lambda_N$) from the fourth launch pigtail 707 is detected.

Figure 44:
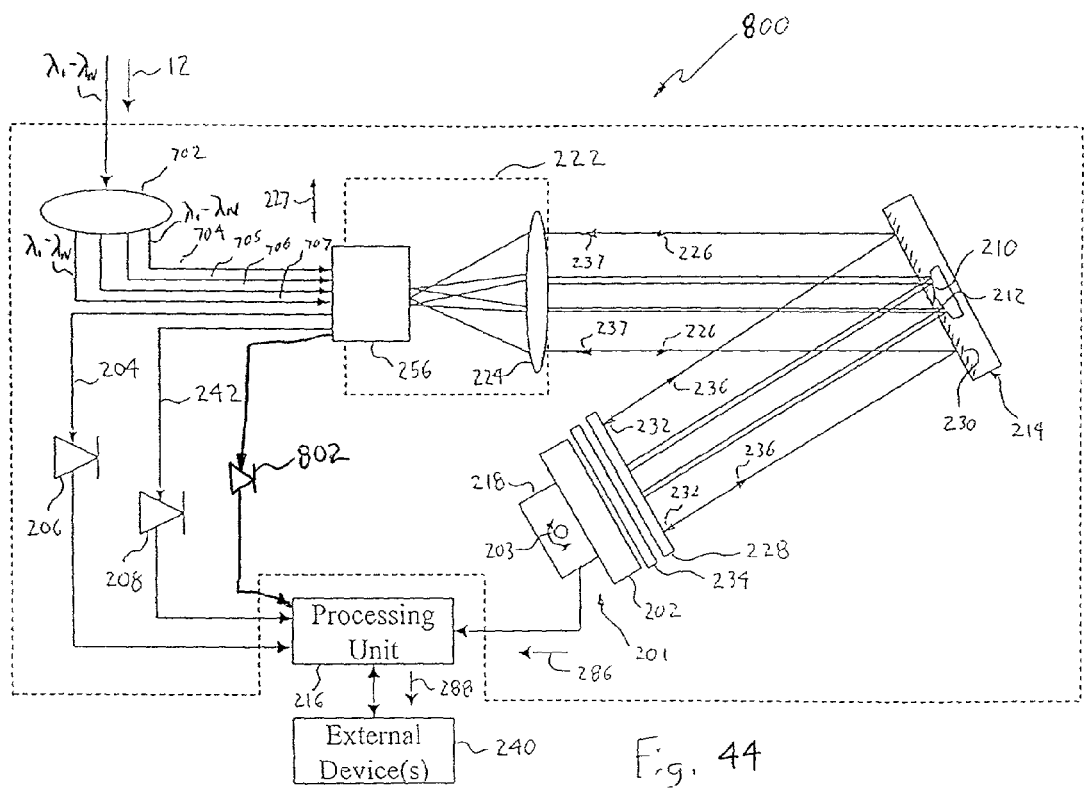
FIG. 44 is a block diagram of another embodiment of a dual pass optical channel monitor in accordance with the present invention.

FIG. 44 shows another embodiment of an OCM 800 that is similar to the OCM 700 of FIG. 43. The OCM 800 also increases the scan or detection rate without having to increase the pivot rate of the pivot mechanism 201. The increased scan rate is achieved by increasing the number of receive pigtails 206,802, corresponding optical detectors 204, 804 and launch pigtails 806-813. The free-ends of the each receive pigtail 206,802 are spaced in the spectral direction 227 to thereby simultaneously receive a pair of respective optical channels, as shown in FIG. 3. The effect of increasing the number of receive pigtails and corresponding optical detectors is the doubling of the sample rate of each of the channels of each input signal 12, as shown in FIG. 42. In other words, each input signal is detected twice over the same period of displacement. For example, the channels of the input signal 12 that are scanned over the period P3 (see FIG. 42) is scanned twice during that period. Consequently, the optical channels ($\lambda_1$-$\lambda_N$) of the input signal 12 are scanned sixteen times over one scanning cycle.

Figure 45:
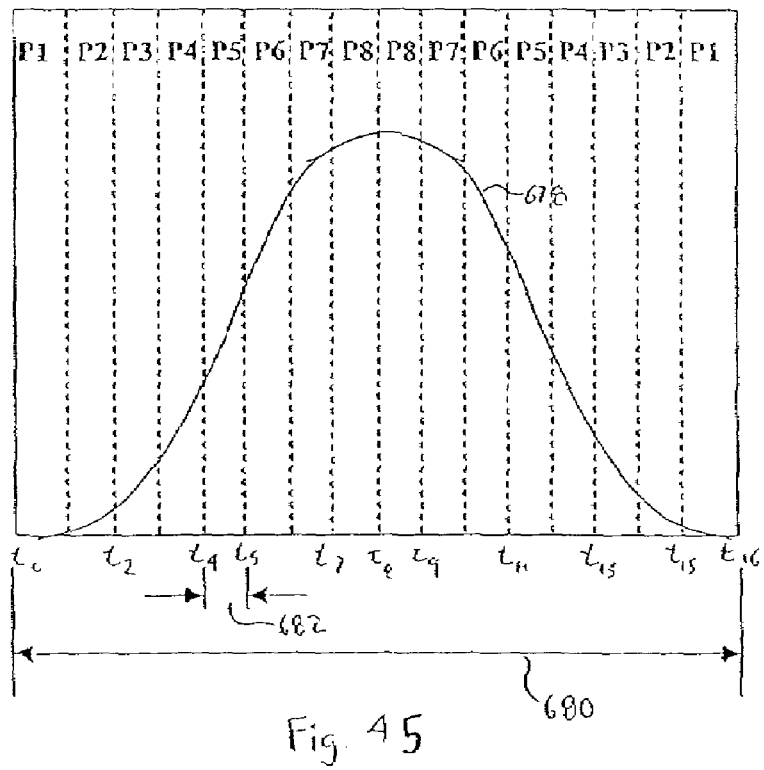
FIG. 45 is a graphical represent of the scanning cycle of an optical channel monitor in accordance with the present invention.

The present invention also contemplates another embodiment that increases the scan rate without increasing the pivot rate or frequency of the pivot mechanism 201. This embodiment includes an optical demultiplexer that divides each input optical signal 12 into at least two groups of input channels 11. Each group of input channels for each input signal is provided to respective launch pigtails that are spatially separated. Consequently, the scan time 682 of each input channel 11 is reduced. If two launch pigtails are provided for each input signal, then the scan time is reduced by one-half, as shown in FIG. 45, which enable more input signals (e.g., eight signals) to be scanned sequentially during one cycle 680 of the pivot mechanism 201 as described hereinbefore. A plurality of receive pigtails corresponding to the number of groups of channels 11 of each input signal 12 are spatially separated to sequentially receive the each group of input light. For example, a pair of spatial separated receive pigtails are provided when each of the input channels is demultiplexed into two groups of signals. One of the optical detectors sequentially senses the light from the first group of channels of all the input signals, and the other optical detector sequentially senses the light from the second group of channels of all the input channels.

Figure 46:
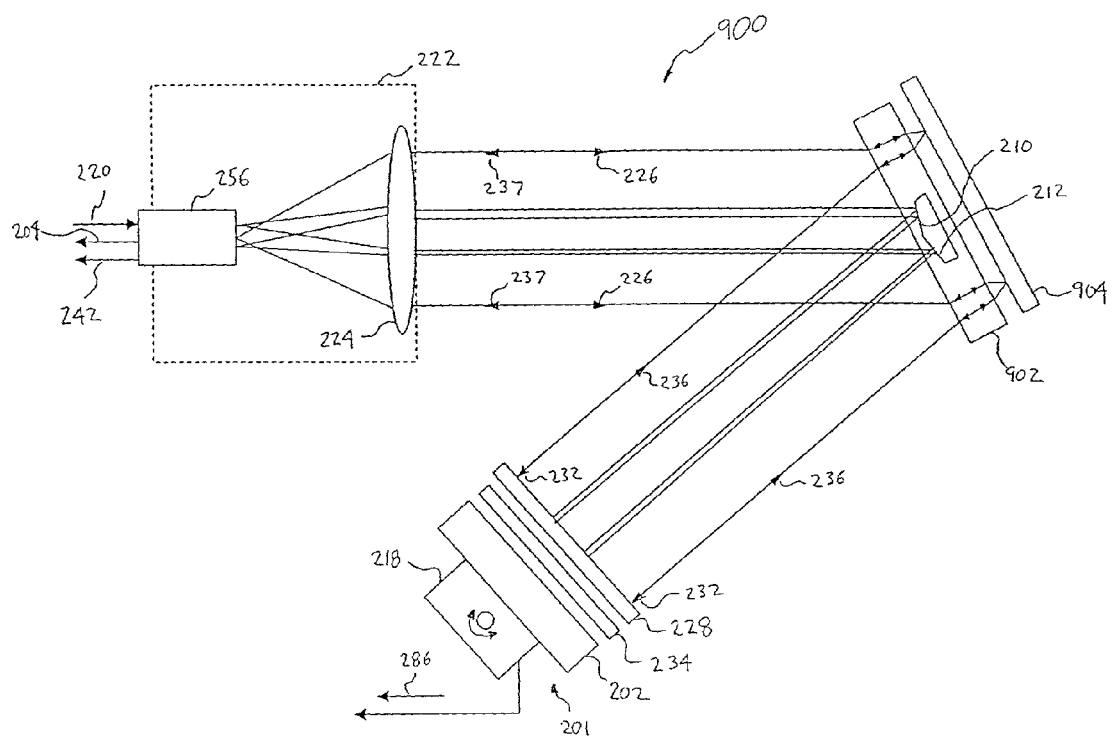
FIG. 46 is a block diagram of another embodiment of a dual pass optical channel monitor in accordance with the present invention.

FIG. 46 shows another embodiment of an OCM 900 that is similar to the OCM 200 of FIG. 14, and therefore similar components have the same reference numeral. The OCM 900 substitutes the diffraction grating 214 of the OCM 200 with a transmissive grating 902 and a reflective surface 904 (e.g., a mirror). The transmissive grating 902 may have a low polarization dependent loss (PDL). In one embodiment the transmissive grating may be a volume phase grating (VPG), however, one will recognize that any known transmissive grating may be used. The mirror 904 is disposed adjacent to the grating 902 to reflect the light passing through the grating back into the grating.

As shown in FIG. 46, the collimated light 226, exiting the collimating lens 224, passes through the transmissive grating 902 and reflects off the mirror 904. The light 226 reflects back through the grating 904 a second time to the reflective element 202 of the pivoting mechanism 201. The light 236 reflected off the reflective element 202 then passes through the transmissive grating 902 a third time. The mirror 904 then reflects the light 230 back through the grating 902 a fourth time to the collimating lens 224, which focuses the light 237 to the first pigtail 204.

Figure 47:
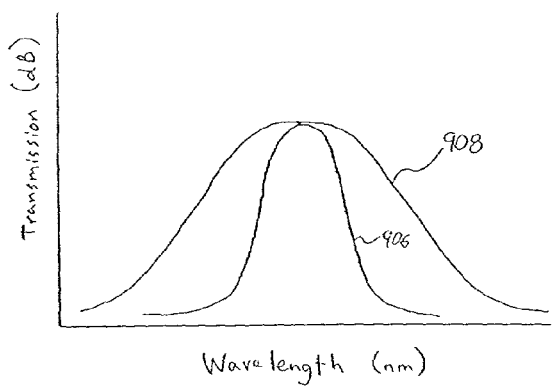
FIG. 47 is a graphical representation of data illustrating the transfer function of the optical channel monitor of FIG. 46 that is superimposed onto the data illustrating the transfer function of the optical channel monitor of FIG. 14.

The light passes through the transmissive grating four times, which has the advantageous effect of narrowing the filter function of the OCM 902 compared to the filter function of the OCM 200 of FIG. 14. For instance, FIG. 47 shows data illustrating the transfer function 906 of the OCM 900, which is superimposed on data illustrating the transfer function 908 of the OCM 200 of FIG. 14. As shown, the width of the filter function 906 of the OCM 900 is narrower than the filter function 908 of the OCM 200, which reflects twice off the diffraction grating 214 of FIG. 14.

While the embodiments of the present invention described hereinbefore have one or two receive pigtails, the present invention contemplates a plurality of receive pigtails less than the number of channels to be detected.

The present invention also contemplates pivoting or turning the collimating lens 222 of an OCM 200, for example, to selectively direct the spaced optical channels onto the ends of the receive pigtail(s) 204. One will appreciate that the present invention contemplates also contemplates translating the ends of the pigtail(s) 204 to detect each of the spaced optical channels.

Figure 48:
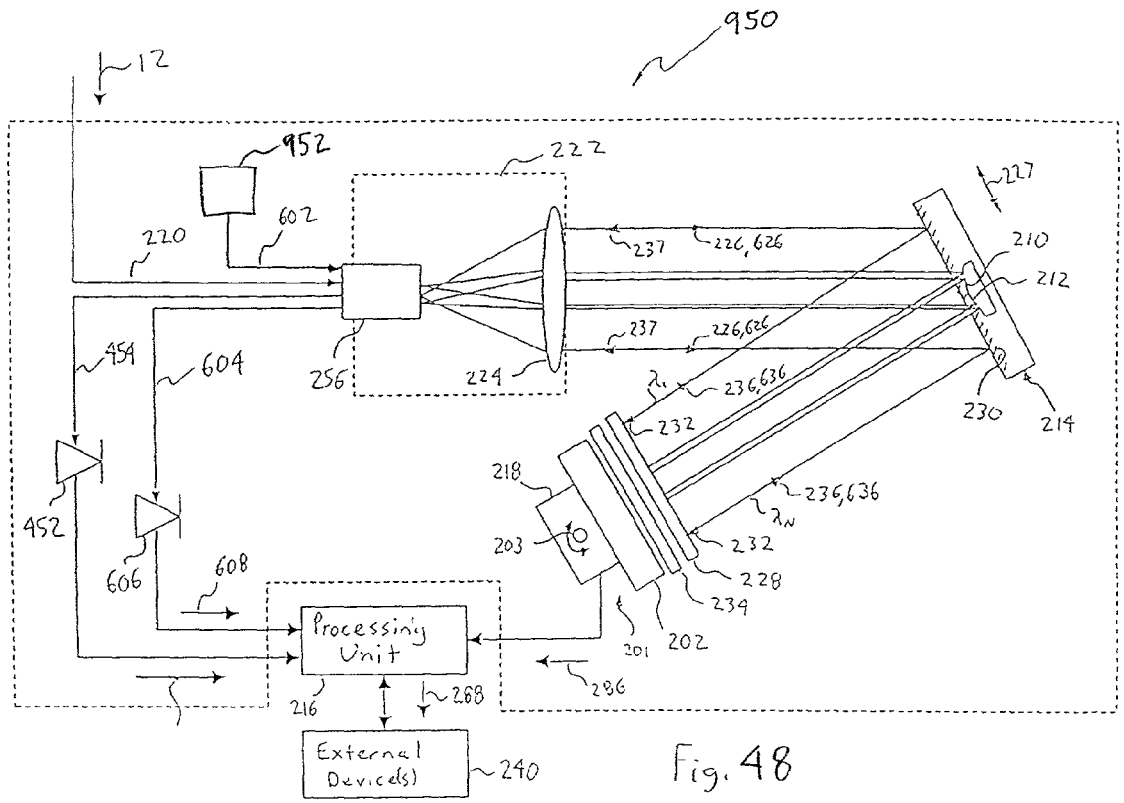
FIG. 48 is a block diagram of another embodiment of a dual pass optical channel monitor in accordance with the present invention.

While the present invention taps or uses a portion of the input signal 12 to provide light for the start mirror(s) 210 and/or stop mirror(s) 212, the invention contemplates an OCM 950 that provides a separate optical source 952 to illuminate the start/stop mirrors as shown in FIG. 48. The source 952 may include a 1300 nm photodiode or any other known optical source. Advantageously, the separate optical source reduces optical loss (i.e., insertion loss) associated with the use of a portion of the input light 12.

Figure 49:
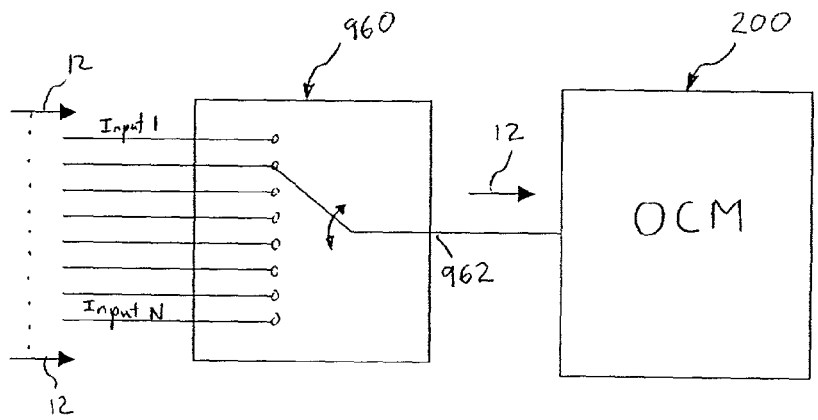
FIG. 49 is an exploded, perspective view of another bracket of the grating mount assembly similar to the bracket of FIG. 39.

FIG. 49 illustrates another embodiment of the present invention that includes a 1×N optical switch 960 and an OCM, such as the OCM 200 of FIG. 14. The optical switch 960 enables a plurality of different input signals, having channels $\lambda_1$-$\lambda_N$, to be selectively provided to the OCM 200 by switching the output port 962 of the optical switch 960 to the desired input signal to be detected or sensed by the OCM 200.

The dimensions and geometries for any of the embodiments described herein are merely for illustrative purposes and, as such, any other dimensions may be used if desired, depending on the application, size, performance, manufacturing requirements, or other factors, in view of the teachings herein.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein without departing from the spirit and scope of the present invention.

What is claimed is:

1. An optical channel monitor of an optical input signal that includes a plurality of optical channels, the optical channel monitor comprising:
   a collimator to collimate the optical input signal and to project collimated light;
   a light dispersion element that diffracts the projected collimated light into spectrally-spaced optical channels;
   a reflector that receives and reflects the spectrally-spaced optical channels back to the light dispersion element;
   the light dispersion element receives the reflected spectrally-spaced optical channels and further separates and diffracts the reflected optical channels;
   the collimator receiving and focusing the further diffracted spectrally-spaced optical channels;
   a first optical waveguide that receives the focused spectrally-spaced optical channels from the collimator;
   a pivoting mechanism that pivots at least one of the light dispersion element and the reflector to spectrally sweep the spectrally-spaced optical channels across the first optical waveguide, the first optical waveguide receiving sequentially each optical channel; and
   a first mirror disposed adjacent to the light dispersion element that provides a first optical reference signal indicative of a first relative position of at least one of the light dispersion element and reflector.

2. The optical channel monitor of claim 1, further comprises a $\lambda/4$ plate disposed optically between the reflector and the light dispersion element.

3. The optical channel monitor of claim 1, further includes a second optical waveguide for receiving at least one of the reflected spectrally-spaced optical channels and receiving the first optical reference signal.

4. The optical channel monitor of claim 1, wherein the first optical waveguide provides the optical input signal to the collimator.

5. The optical channel monitor of claim 1, further includes an optical detector that senses a parameter of the at least one selected optical channel and provides a sensed signal indicative of the sensed parameter.

6. The optical channel monitor of claim 1, further includes a second mirror disposed adjacent to the light dispersion element to provide a second optical reference signal indicative of a second relative position of at least one of the light dispersion element and the reflector.

7. The optical channel monitor of claim 1, wherein the pivoting mechanism further includes an actuator for moving the at least one of the reflector and the light dispersion element about a pivot point.

8. The optical channel monitor of claim 7, wherein the actuator includes at least one of a voice coil, electro-ceramics, a motor and cam configuration, a motor and slide configuration, an arc motor, a linear motor, a magnetic pulse drive and a stepper motor.

9. The optical channel monitor of claim 1, wherein the reflector is at least one of a flat mirror, a folded mirror, a roof prism and a reflecting dihedron.

10. The optical channel monitor of claim 1, further includes a cylindrical lens disposed between the light dispersion element and the reflector.

11. The optical channel monitor of claim 1, further includes a photodetector and a device having a slit wherein the slit is optically disposed between the photodetector and the light dispersion element to filter the spectrally-spaced optical channels.

12. The optical channel monitor of claim 1, further comprises a $\lambda/4$ plate disposed optically between the reflector and the light dispersion element, wherein the light dispersion element includes lines having a direction, wherein the $\lambda/4$ plate has a fast axis, and wherein the fast axis is angularly disposed at 45 degrees to the direction of the lines of the light dispersion element.

13. The optical channel monitor of claim 1, wherein the light dispersion element is a diffraction grating.

14. The optical channel monitor of claim 1, wherein the collimator includes at least one of an aspherical lens, an achromatic lens, a doublet or a laser diode doublet.

15. The optical channel monitor of claim 3, further comprising a pair of optical detectors that respectively detect the output of the first and second optical waveguides.

16. The optical channel monitor of claim 1, further comprising an optical source to provide light that is projected onto and that reflects off of the first mirror to provide the first optical reference signal.

17. An optical channel monitor of an optical input signal that includes a plurality of optical channels, the optical channel monitor comprising:
   a collimator to collimate the optical input signal and to project collimated light;
   a light dispersion element that diffracts the projected collimated light into spectrally-spaced optical channels;
   a reflector having a reflective surface that receives and reflects the spectrally-spaced optical channels off the reflective surface back to the light dispersion element;
   the light dispersion element receives the reflected spectrally-spaced optical channels and further separates and diffracts the reflected optical channels;
   said collimator being positioned to receive and focus the spectrally-spaced optical channels;
   a first optical waveguide that receives the focused spectrally-spaced optical channels from said collimator; and
   a pivoting mechanism that pivots the reflector to spectrally sweep the spectrally-spaced optical channels across the first optical waveguide, the first optical waveguide receiving sequentially each optical channel.

18. The optical channel monitor of claim 17, further comprises a λ/4 plate disposed optically between the reflector and the light dispersion element.

19. The optical channel monitor of claim 17, further includes a second optical waveguide that provides the optical input signal to the collimator.

20. The optical channel monitor of claim 17, wherein the first optical waveguide provides the optical input signal to the collimator.

21. The optical channel monitor of claim 17, further includes an optical detector that senses a parameter of at least one reflected optical channel and provides a sensed signal indicative of the parameter of the at least one reflected optical channel.

22. The optical channel monitor of claim 9, further includes a second mirror disposed adjacent to the light dispersion element to provide a second optical reference signal indicative of a second relative position of the reflector.

23. The optical channel monitor of claim 17, wherein the pivoting mechanism further includes an actuator for moving the reflector about a pivot point.

24. The optical channel monitor of claim 23, wherein the actuator includes at least one of a voice coil, electro-ceramics, a motor and cam configuration, a motor and slide configuration, an arc motor, a linear motor, a magnetic pulse drive and a stepper motor.

25. The optical channel monitor of claim 17, wherein the reflector is at least one of a flat mirror, a folded mirror, a roof prism and a reflecting dihedron.

26. The optical channel monitor of claim 17, further includes a cylindrical lens disposed between the light dispersion element and the reflector.

27. The optical channel monitor of claim 17, further includes a photodetector and a device having a slit wherein the slit is optically disposed between the photodetector and the light dispersion element to filter the spectrally-spaced optical channels.

28. The optical channel monitor of claim 17, further comprises a λ/4 plate disposed optically between the reflector and the light dispersion element, wherein the light dispersion element includes lines having a direction, wherein the λ/4 plate has a fast axis, and wherein the fast axis is angularly disposed at 45 degrees to the direction of the lines of the light dispersion element.

29. The optical channel monitor of claim 17, wherein the light dispersion element is a diffraction grating.

30. The optical channel monitor of claim 17, wherein the collimator includes at least one of an aspherical lens, an achromatic lens, a doublet or a laser diode doublet.

31. The optical channel monitor of claim 19, further comprising a pair of optical detectors that respectively detect the output of the first and second optical waveguides.

32. The optical channel monitor of claim 9, further comprising an optical source to provide light for projecting onto and reflecting off of the first mirror.

33. The optical channel monitor of claim 17, further comprising an optical switch to selectively provide one of a plurality of optical input signals to the first optical waveguide.

34. The optical channel monitor of claim 17, further including a first minor disposed adjacent to the light dispersion element that provides a first optical reference signal indicative of a first relative position of the reflector.

35. The optical channel monitor of claim 34, wherein the first mirror is disposed above or below the diffraction grating.

36. The optical channel monitor of claim 34, wherein the first mirror is disposed in front of the light dispersion element.

37. The optical channel monitor of claim 34, wherein the first mirror is disposed on a side the light dispersion element.

38. The optical channel monitor of claim 34, wherein a portion of the input optical signal reflects off the first mirror to provide the first optical reference signal.

39. The optical channel monitor of claim 34, further includes a second optical waveguide for receiving at least one of the reflected spectrally-spaced optical channels and the first optical reference signal.

40. The optical channel monitor of claim 34, further includes the first optical waveguide receives the first optical reference signal.

41. An optical channel monitor of an optical input signal that includes a plurality of optical channels, the optical channel monitor comprising:
   a collimator to collimate the optical input signal and to project collimated light;
   a light dispersion element that diffracts the collimated light into spectrally-spaced optical channels;
   a reflector having a reflective surface that reflects the spectrally-spaced optical channels off the reflective surface back to the light dispersion element;
   a first optical waveguide that receives the reflected spectrally-spaced optical channels from the light dispersion element;
   a pivoting mechanism that pivots the reflector to spectrally sweep the spectrally-spaced optical channels across the first optical wave guide, the first optical waveguide receiving sequentially each optical channel;
   a first mirror disposed adjacent to the light dispersion clement that provides a first optical reference signal indicative of a first relative position of the reflector;
   wherein the first optical reference signal is indicative of the beginning or ending of a pivot cycle of the reflector.

42. An optical channel monitor of an optical input signal that includes a plurality of optical channels, the optical channel monitor comprising:
   a collimator to collimate the optical input signal and to project collimated light;
   a light dispersion element that diffracts the collimated light into spectrally-spaced optical channels;

a reflector that reflects the spectrally-spaced optical channels back to the light dispersion element;

a first optical waveguide that receives the reflected spectrally-spaced optical channels from the light dispersion element;

a pivoting mechanism that pivots at least one of the light dispersion element and the reflector to spectrally sweep the spectrally-spaced optical channels across the first optical waveguide, the first optical wave guide receiving sequentially each optical channel;

a first mirror disposed adjacent to the light dispersion element that provides a first optical reference signal indicative of a first relative position of the at least one of the pivoting light dispersion element and pivoting reflector;

wherein the reflector is at least one of a flat mirror, a folded mirror, a roof prism and a reflecting dihedron; and a second mirror disposed adjacent to the light dispersion element to provide a second optical reference signal indicative of a second relative position of the reflector;

wherein the first optical reference signal is indicative of a first position of the reflector at one end of the reflector's movement and the second optical reference signal is indicative of a second position of the reflector at the other end of the reflector's movement.

43. The optical channel monitor of claim 17, wherein the pivoting mechanism is a resonant system.

44. The optical channel monitor of claim 43, wherein the pivoting mechanism includes a magnetic pulse drive for moving the reflector.

45. The optical channel monitor of claim 1, further includes a second optical waveguide that provides the optical signal to the collimator.

46. The optical channel monitor of claim 1, further includes the first optical waveguide receives the first optical reference signal.

47. An optical channel monitor of an optical input signal that includes a plurality of optical channels, the optical channel monitor comprising:

a collimator to collimate the optical input signal and to project collimated light;

a light dispersion element that diffracts the collimated light into spectrally-spaced optical channels;

a reflector that reflects the spectrally-spaced optical channels back to the light dispersion element;

a first optical waveguide that receives the reflected spectrally-spaced optical channels from the light dispersion element;

a pivoting mechanism that pivots at least one of the light dispersion element and the reflector to spectrally sweep the spectrally-spaced optical channels across the first optical waveguide, the first optical waveguide receiving sequentially each optical channel; and a first mirror disposed adjacent to the light dispersion element that provides a first optical reference signal indicative of a first relative position of at least one of the pivoting light dispersion element and the pivoting reflector;

wherein the first optical reference signal is indicative of the beginning or ending of a pivot cycle of the reflector.

48. The optical channel monitor of claim 1, wherein the first mirror is disposed above or below the light dispersion element.

49. The optical channel monitor of claim 1, wherein the first mirror is disposed in front of the light dispersion element.

50. The optical channel monitor of claim 1, wherein the first mirror is disposed on a side the light dispersion element.

51. The optical channel monitor of claim 1, wherein a portion of the input optical signal reflects off the first mirror to provide the first optical reference signal.

52. An optical channel monitor of an optical input signal that includes a plurality of optical channels, the optical channel monitor comprising:

a collimator to collimate the optical input signal and to project collimated light;

a light dispersion element that diffracts the collimated light into spectrally-spaced optical channels;

a reflector that reflects the spectrally-spaced optical channels back to the light dispersion element;

a first optical waveguide that receives the reflected spectrally-spaced optical channels from the light dispersion element;

a pivoting mechanism that pivots at least one of the light dispersion element and the reflector to spectrally sweep the spectrally-spaced optical channels across the first optical waveguide, the first optical waveguide receiving sequentially each optical channel;

a first mirror disposed adjacent to the light dispersion element that provides a first optical reference signal indicative of a first relative position of the at least one of the pivoting light dispersion element and the pivoting reflector; and a second mirror disposed adjacent to the light dispersion element that provides a second optical reference signal indicative of a second relative position of at least one of the pivoting light dispersion element and the pivoting reflector;

wherein the first optical reference signal is indicative of a first position of the reflector at one end of the reflector's movement and the second optical reference signal is indicative of a second position of the reflector at the other end of the reflector's movement.

53. The optical channel monitor of claim 1, wherein the pivoting mechanism is a resonant system.

54. The optical channel monitor of claim 53, wherein the pivoting mechanism includes a magnetic pulse drive for moving the reflector.

55. The optical channel monitor of claim 1, wherein the first minor reflects collimated light from the collimator to provide the optical reference signal.

56. The optical channel monitor of claim 34, wherein the first mirror reflects collimated light from the collimator to provide the optical reference signal.

* * * * *